United States Patent [19]

LeVasseur

[11] 4,012,834
[45] Mar. 22, 1977

[54] METHOD OF AND APPARATUS FOR AUTOMATIC PRODUCTION OF ARMATURES

[75] Inventor: Arnold P. LeVasseur, Lakeville, Minn.

[73] Assignee: Possis Corporation, Minneapolis, Minn.

[22] Filed: Apr. 2, 1976

[21] Appl. No.: 672,867

Related U.S. Application Data

[62] Division of Ser. No. 607,048, Aug. 22, 1975, Pat. No. 3,980,184, which is a division of Ser. No. 477,549, June 7, 1974, Pat. No. 3,920,129.

[52] U.S. Cl. .................................. 29/597; 29/733; 29/736; 29/598; 198/389
[51] Int. Cl.² .................................. H02K 15/02
[58] Field of Search ............... 29/597, 598, 205 L, 29/205 LM, 205 D, 205 R; 214/1 Q, 38 R, 38 D; 198/244

[56] References Cited
UNITED STATES PATENTS

| | | | |
|---|---|---|---|
| 3,624,890 | 12/1971 | Schuette et al. | 29/205 LM |
| 3,734,314 | 5/1973 | Zepp | 29/205 R |

Primary Examiner—Carl E. Hall
Attorney, Agent, or Firm—Ira Milton Jones and Associates

[57] ABSTRACT

An automatic armature production line comprising an assembling machine by which the component parts of an armature core assembly are assembled, a bank of armature winding machines by which the armatures are wound, a welding machine by which the wire leads connecting successively wound coils are physically and electrically connected to the terminals of the commutator, a testing station at which the completed armatures are tested for electrical continuity, and a transfer system by which the armature core assemblies and then the wound armatures are quickly moved from one work station to another, the transfer system comprising a plurality of identical cylindrical carriers that have axial cavities into which the armature core assemblies and the wound armatures are inserted and which roll along downwardly inclined tracks that lead from station to station, and which carriers have a flat surface spaced from their axes of rotation to coact with flat surfaced guides at the different work stations to hold the carriers in positions of rotation at which the armature core assemblies and wound armatures have a predetermined rotary orientation with respect to the work performing mechanism at the work stations.

11 Claims, 51 Drawing Figures

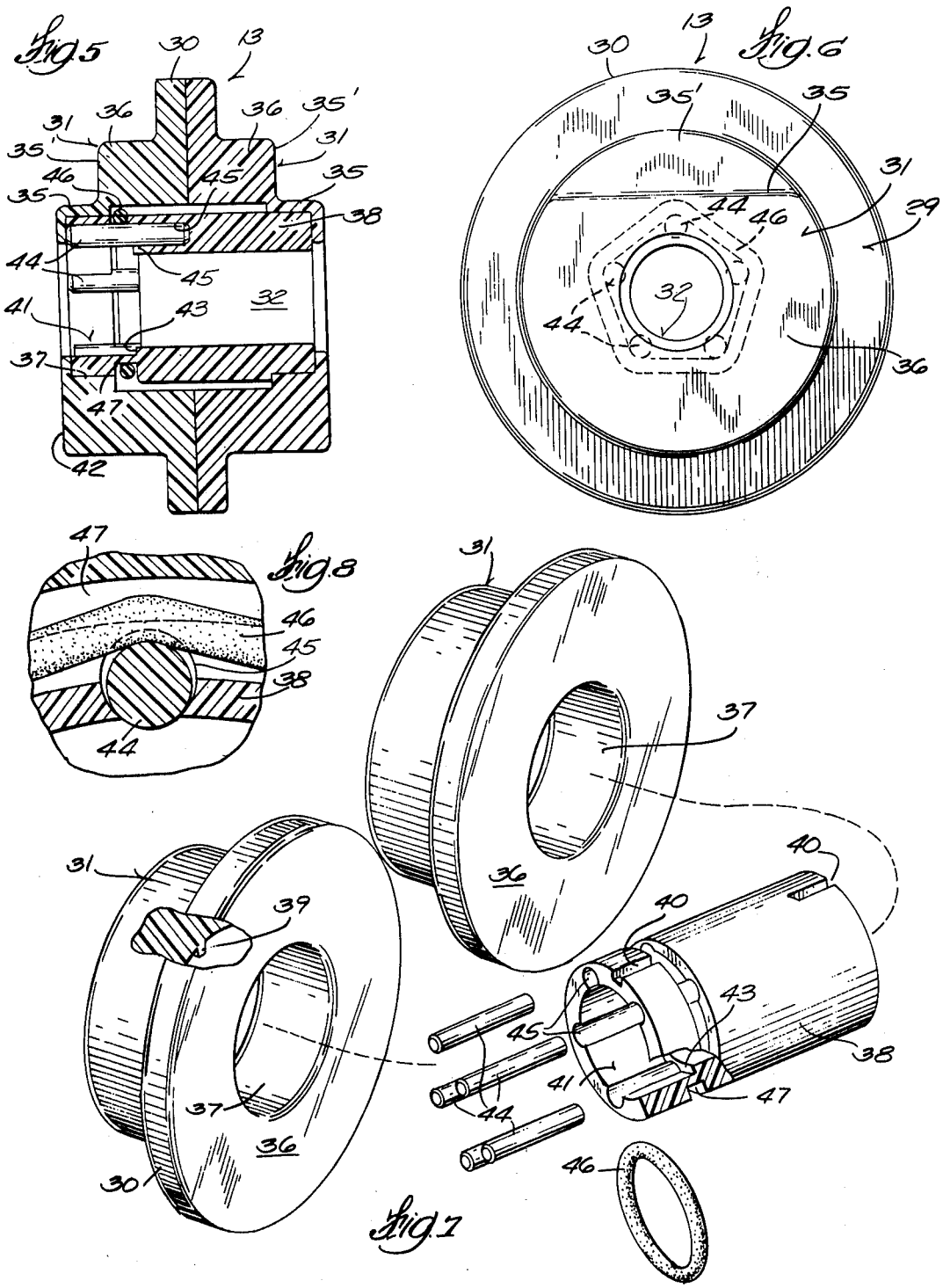

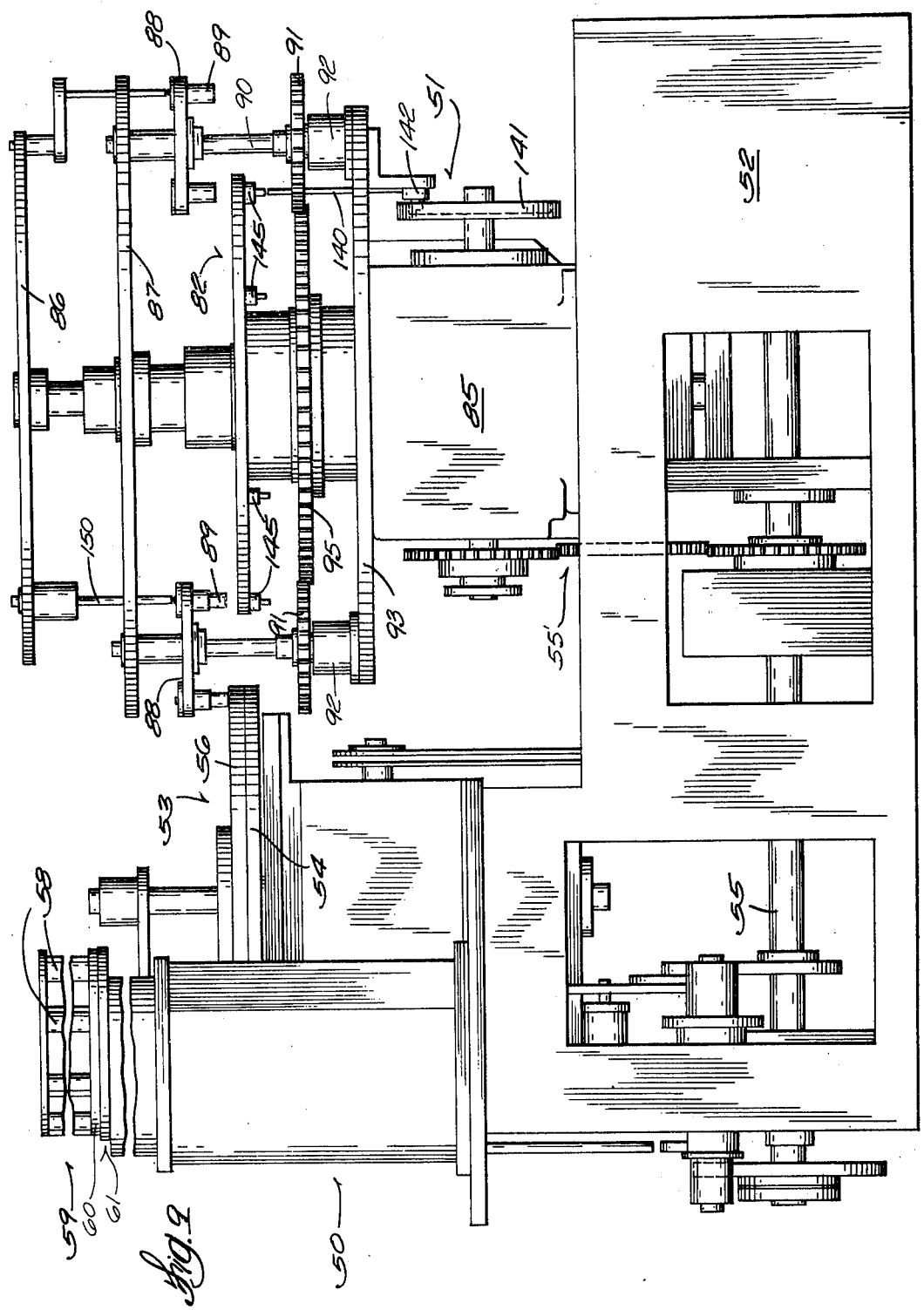

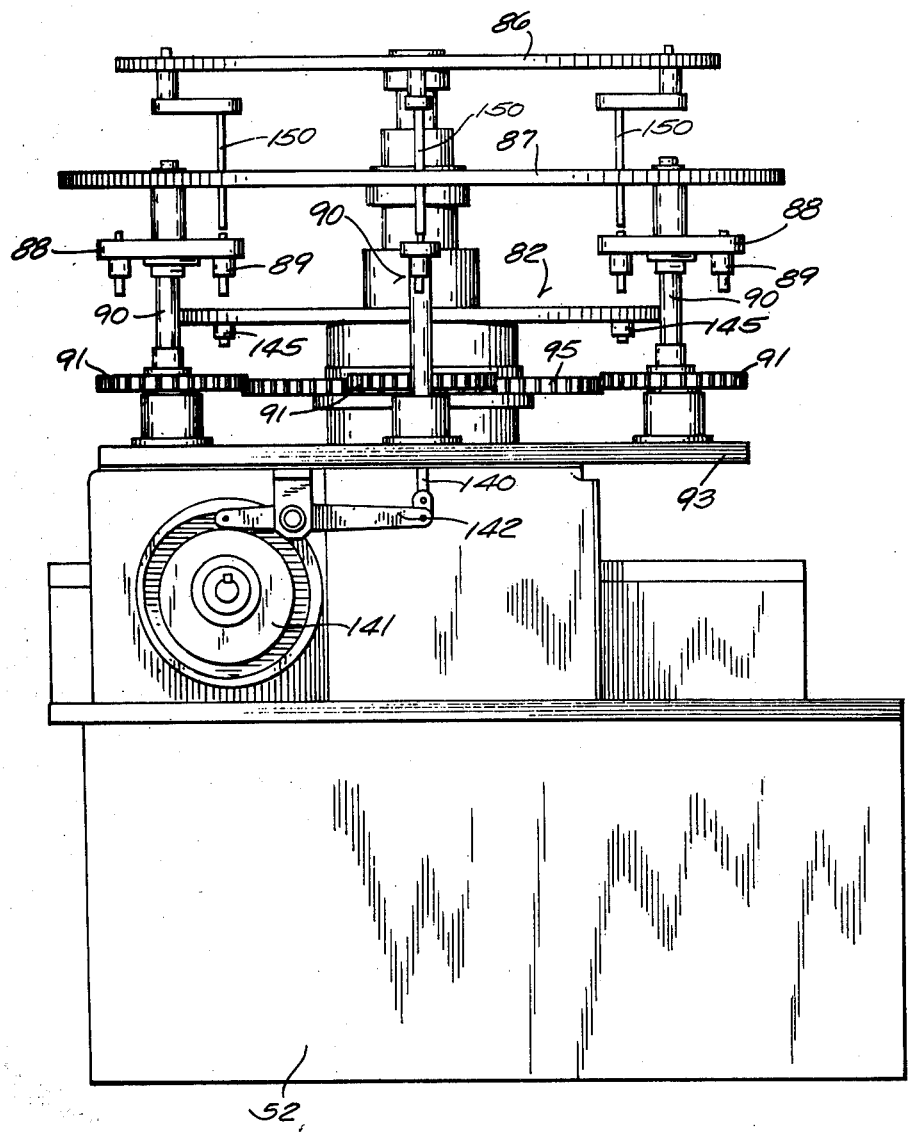

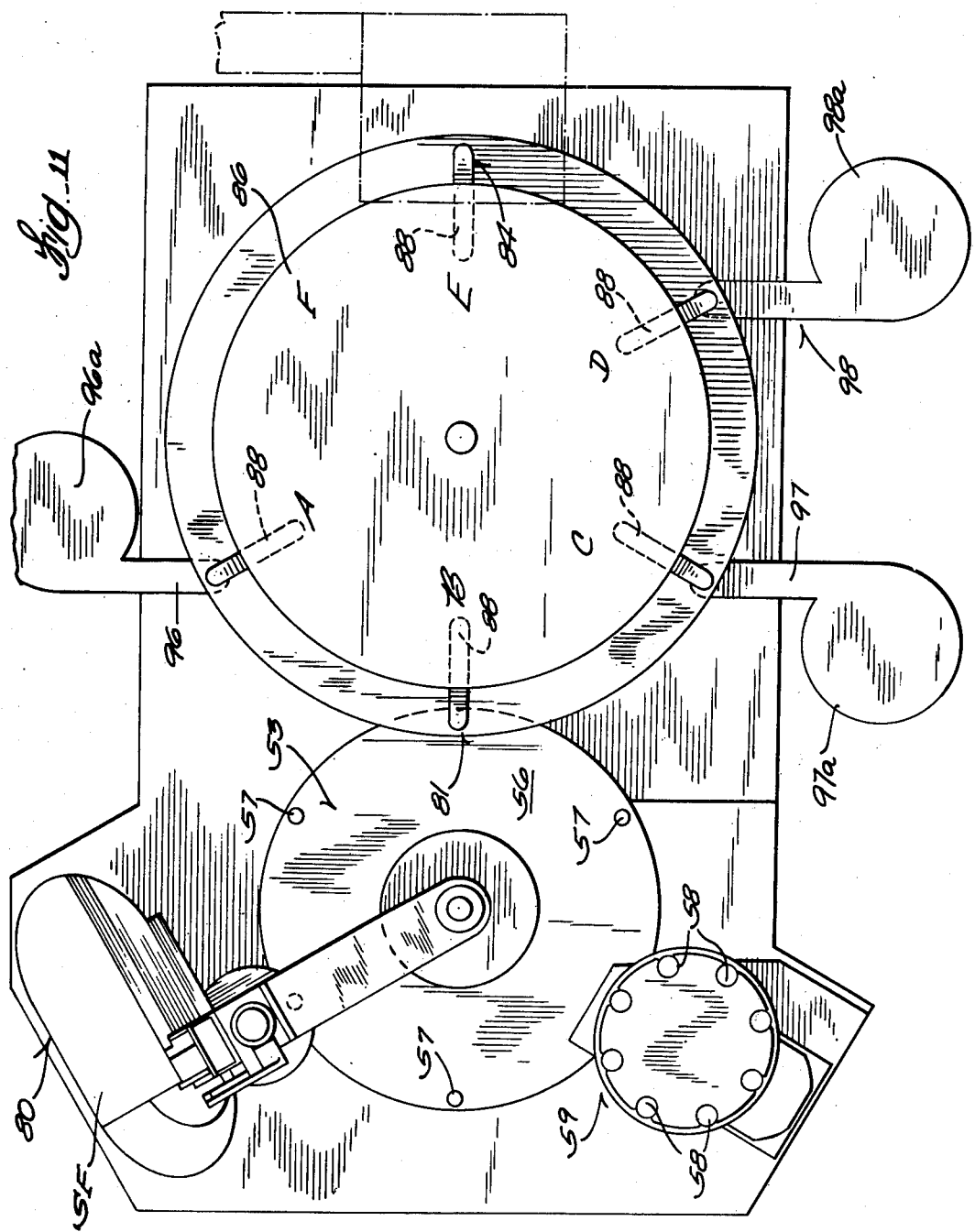

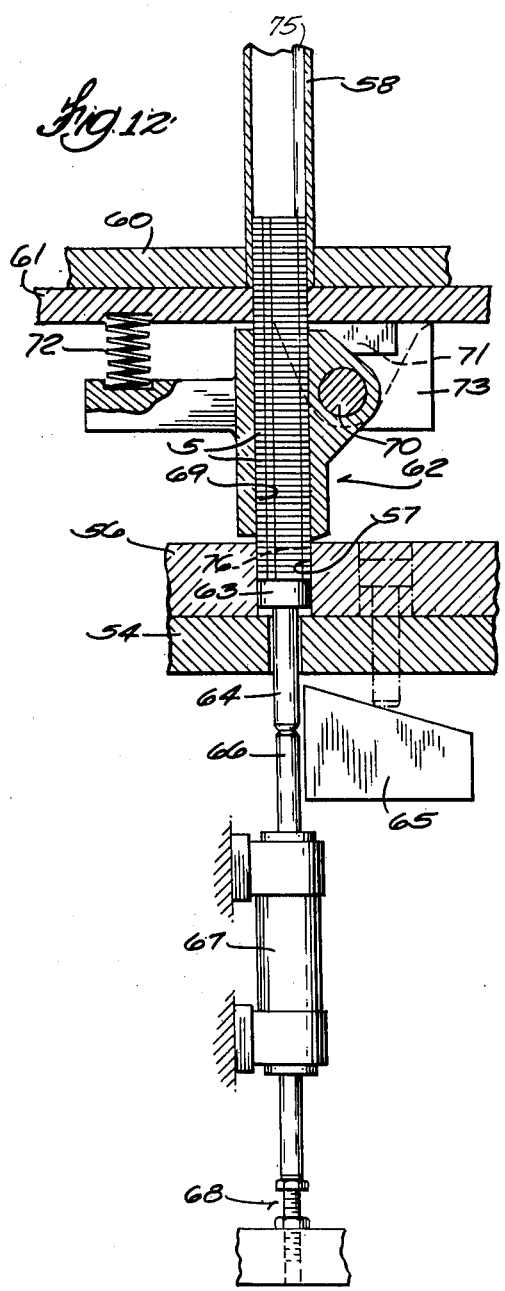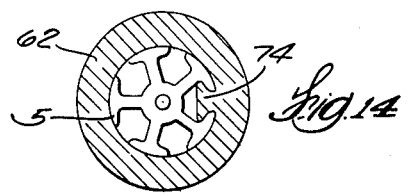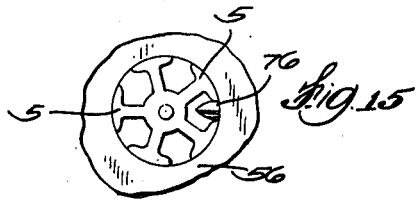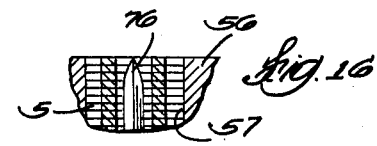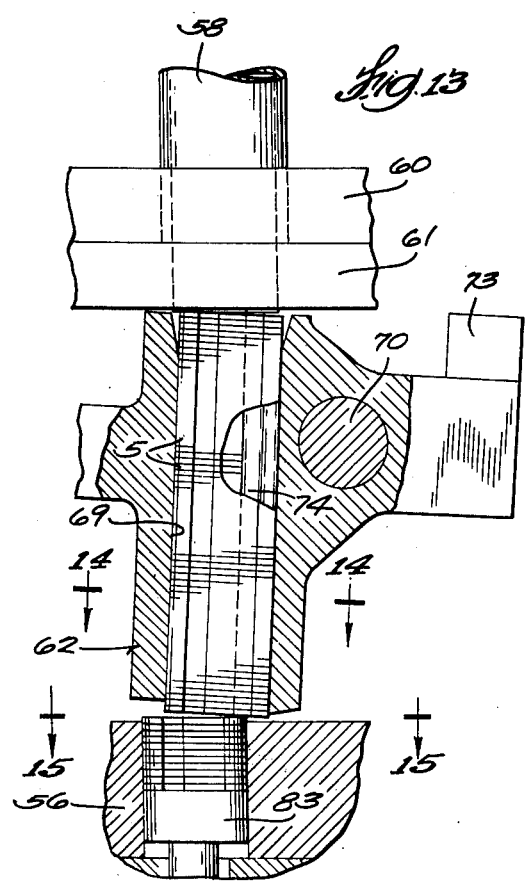

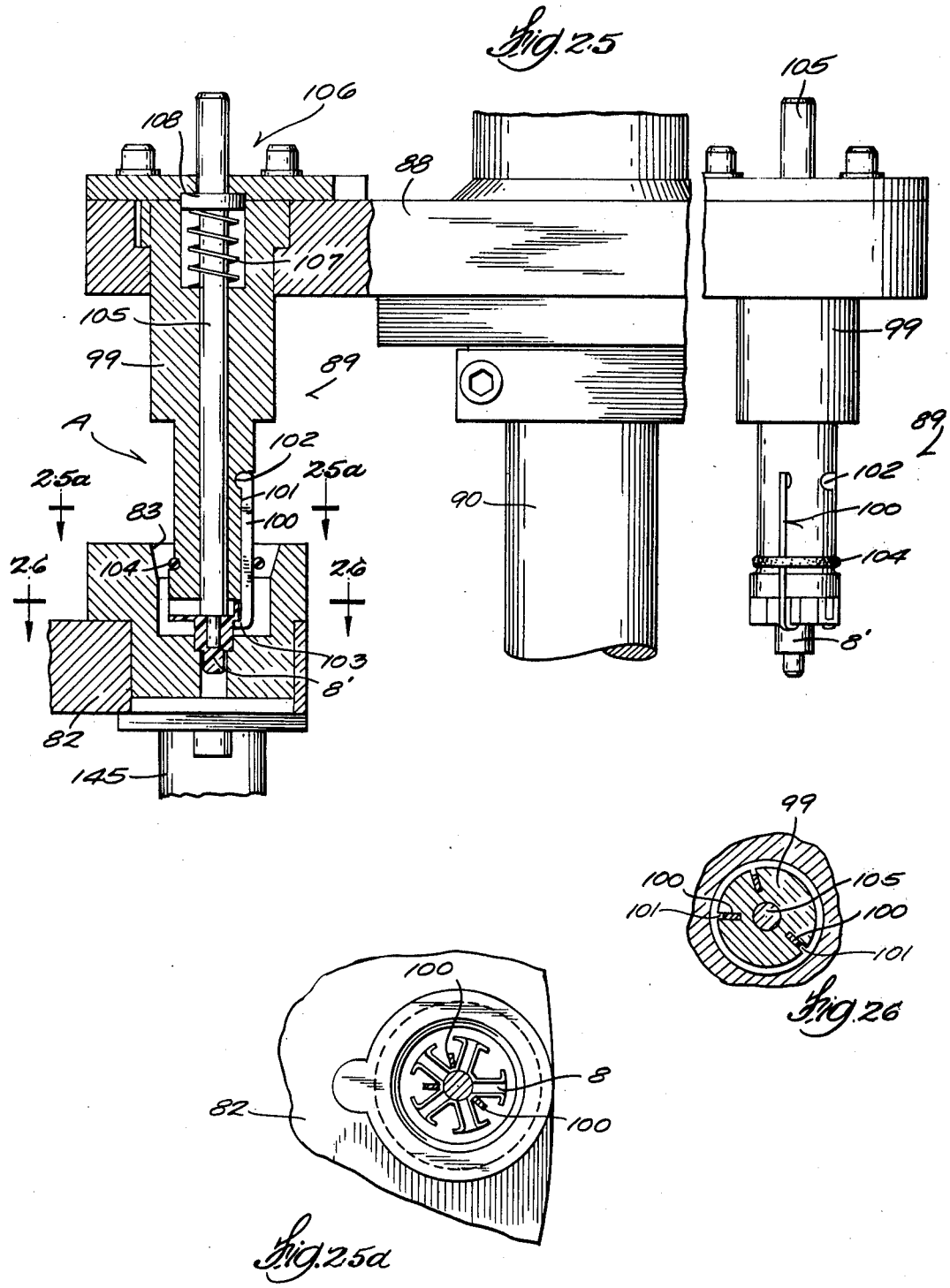

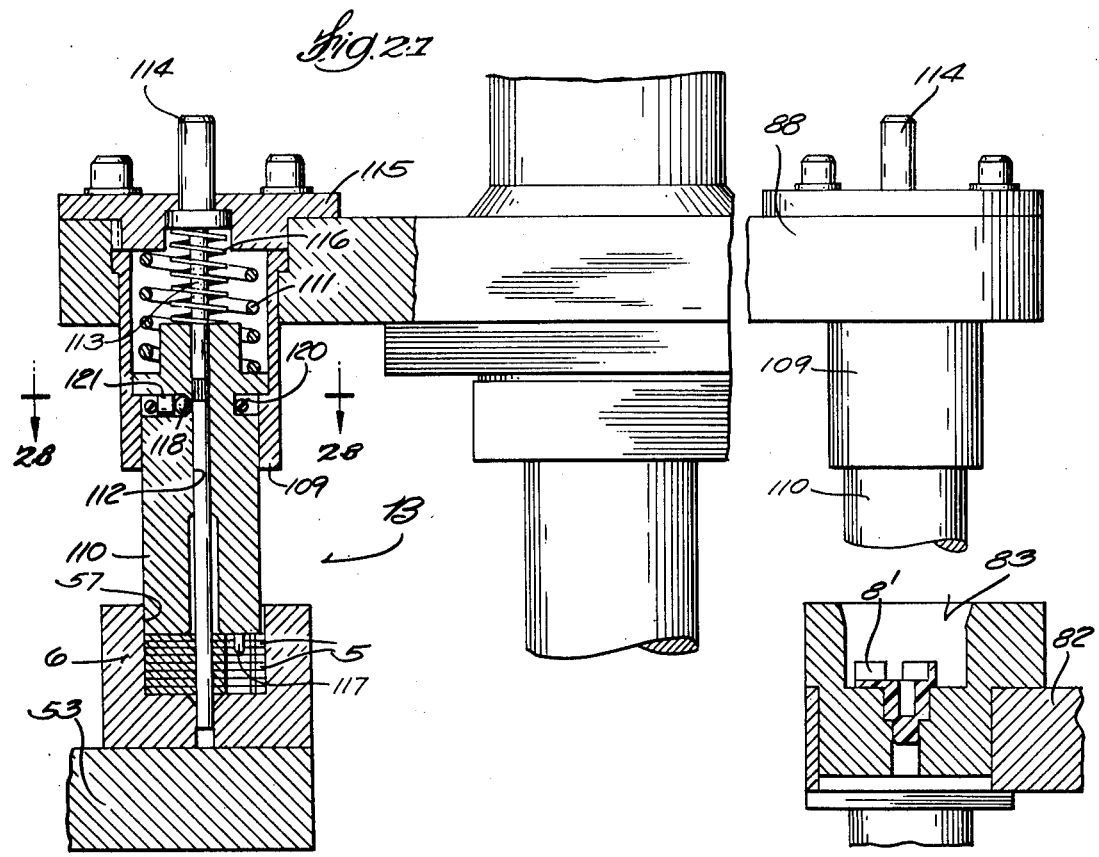
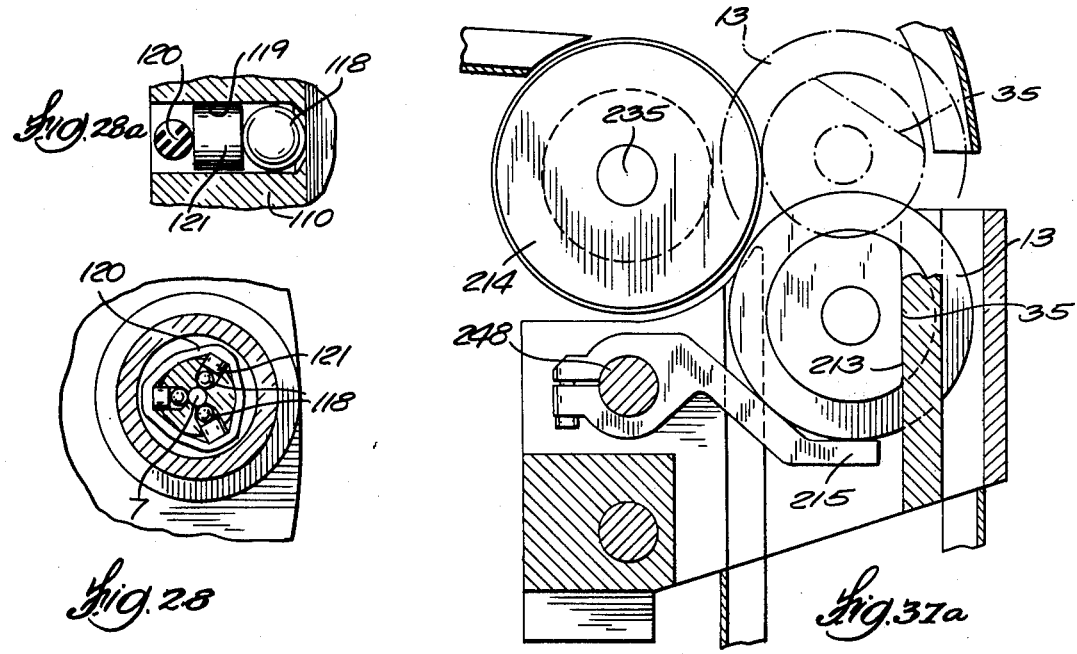

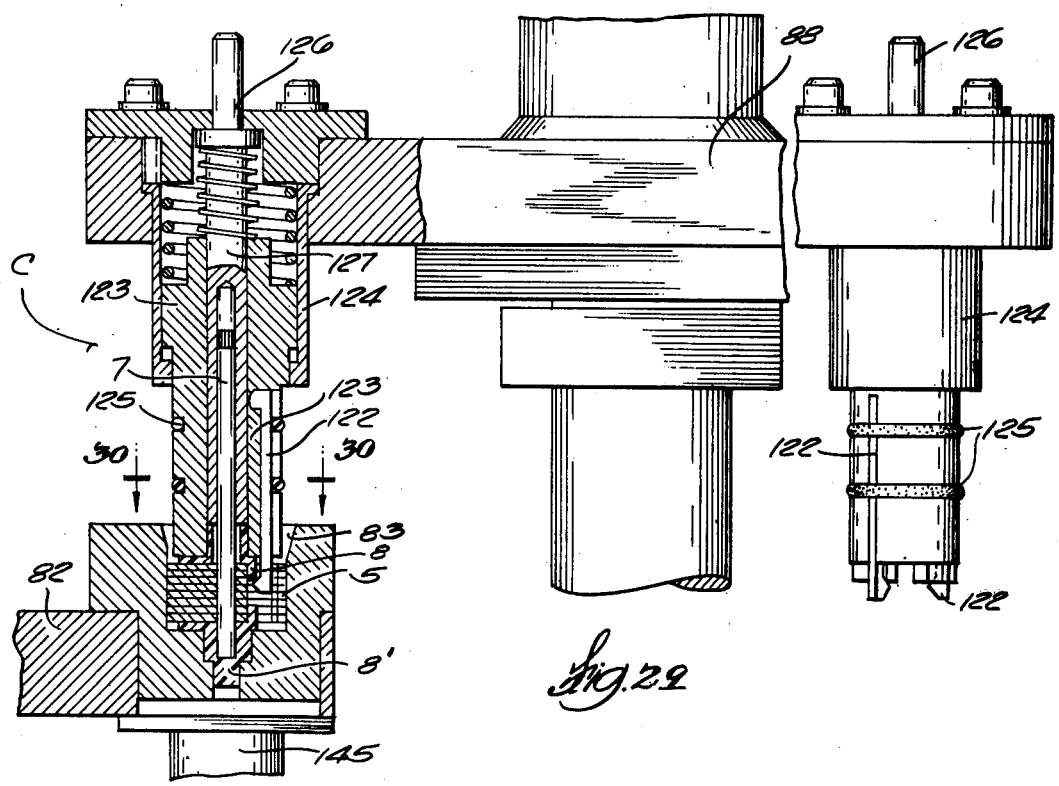
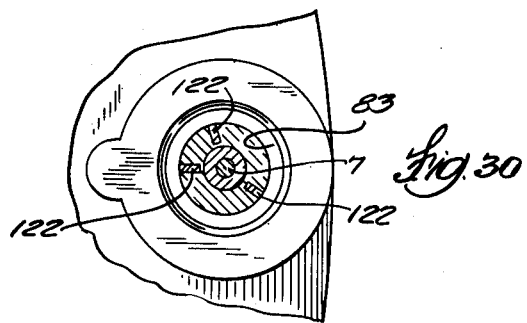

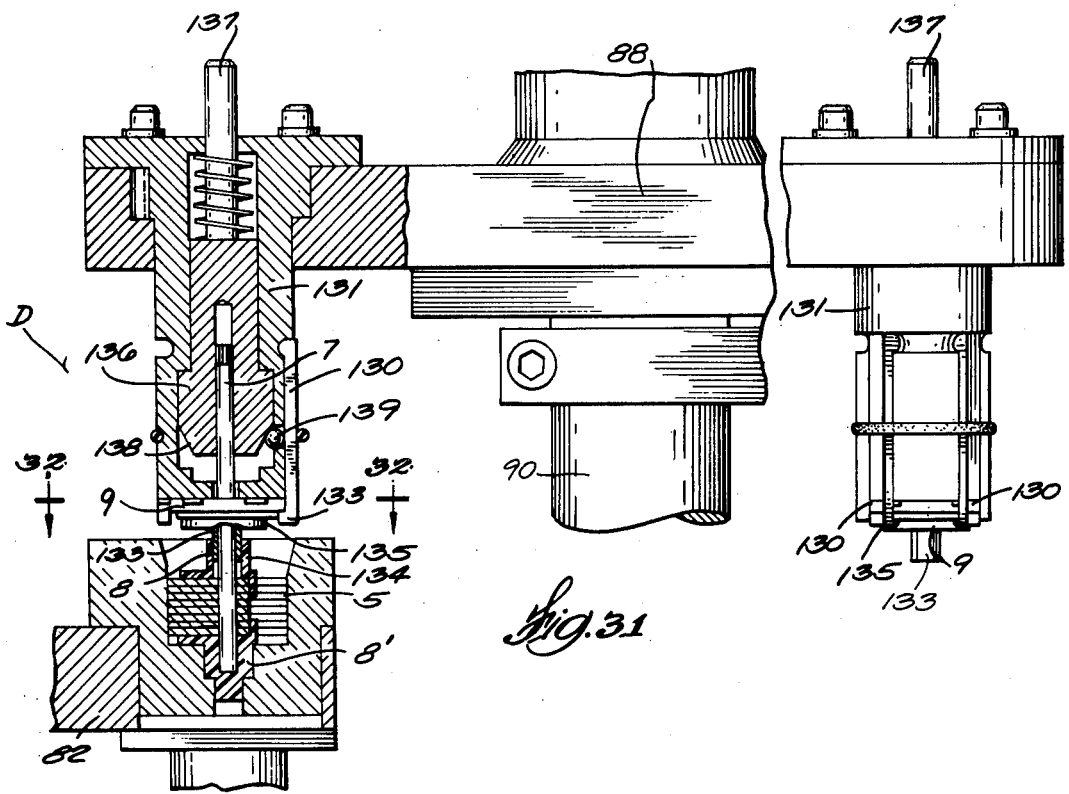
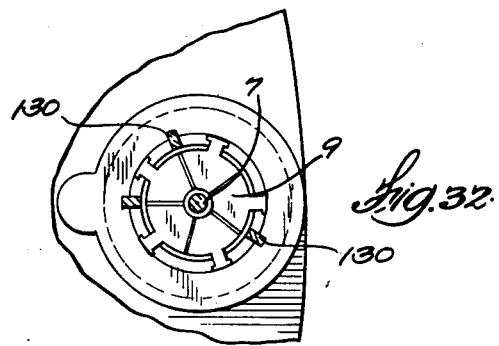
Fig. 31
Fig. 32

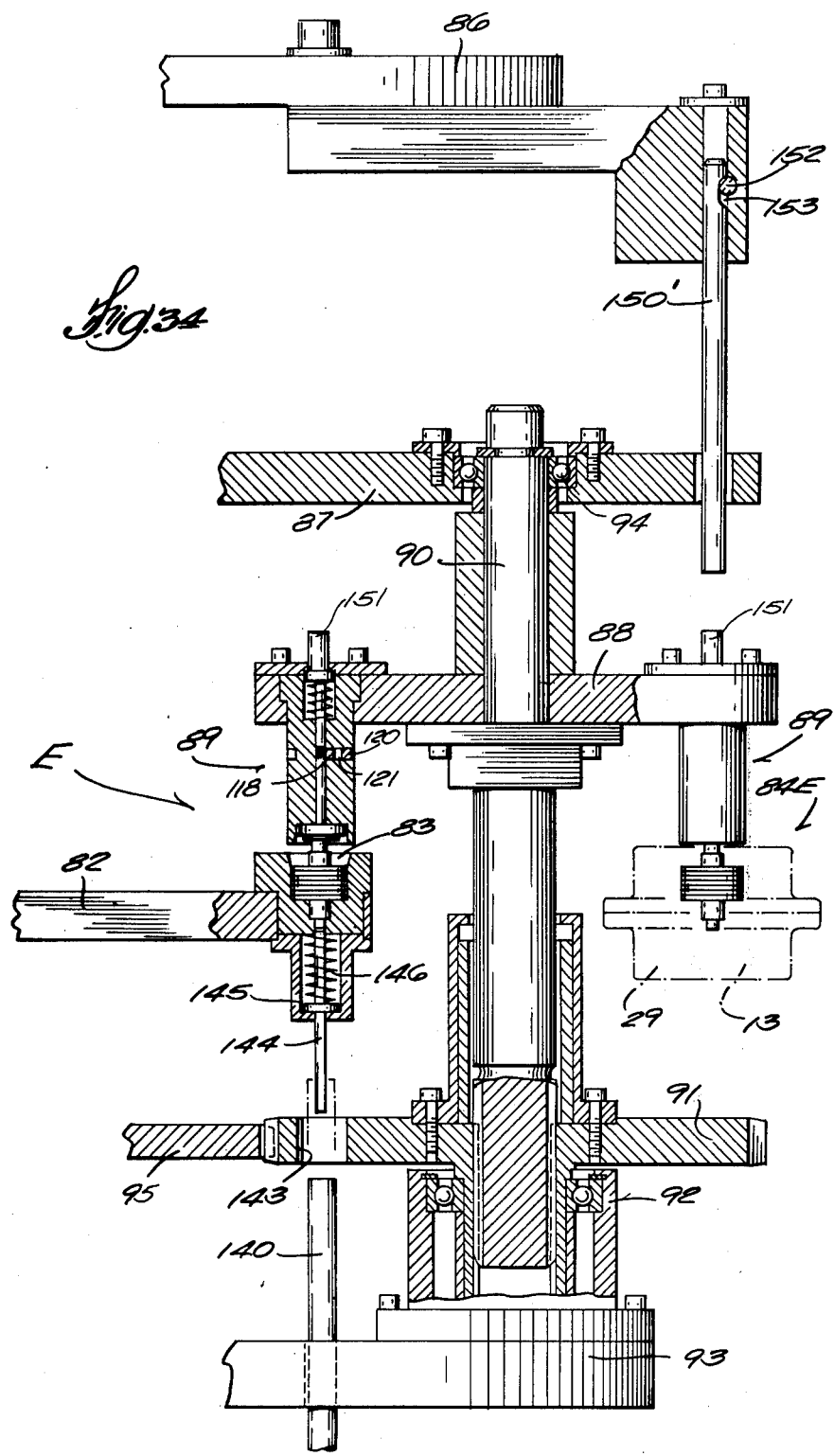

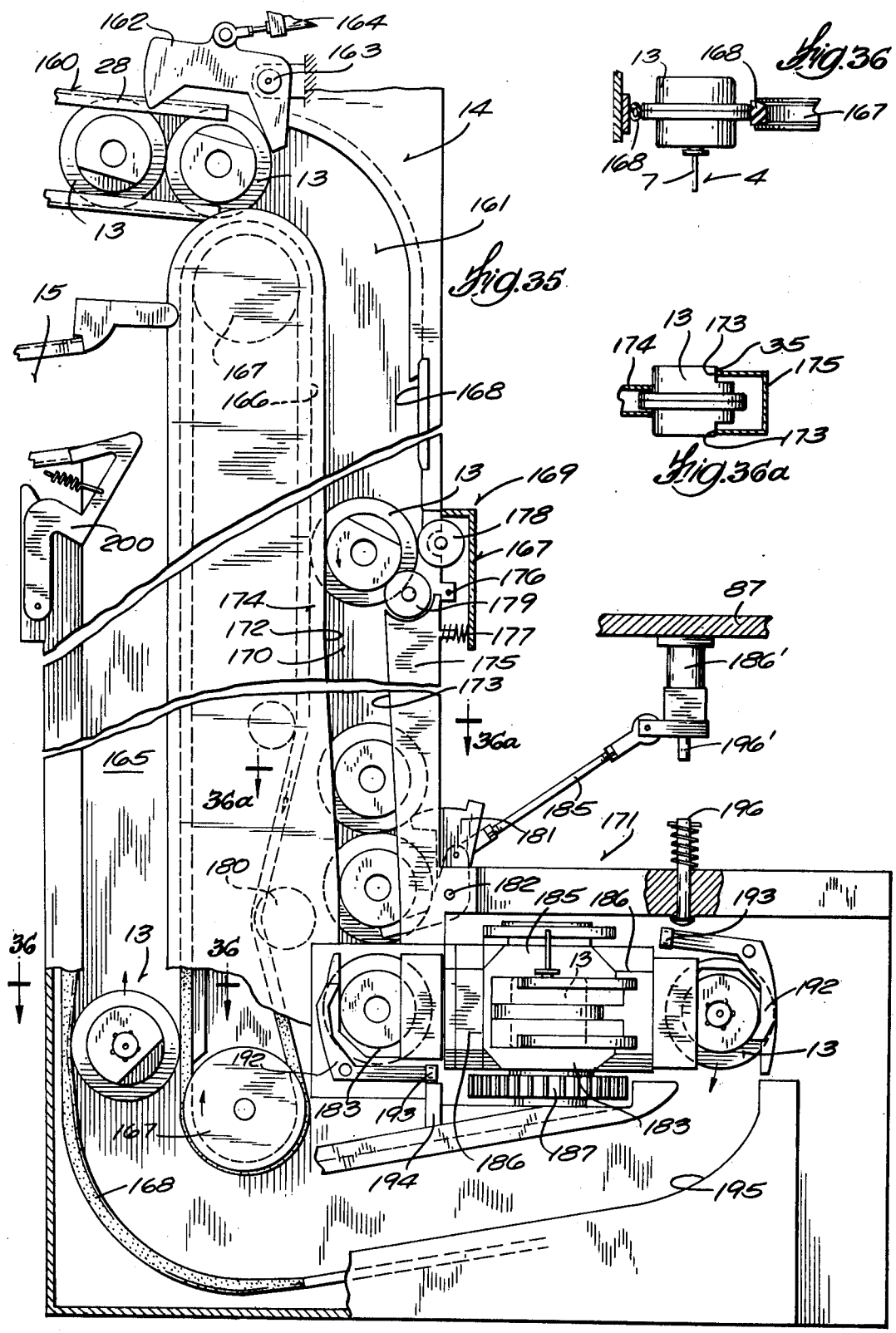

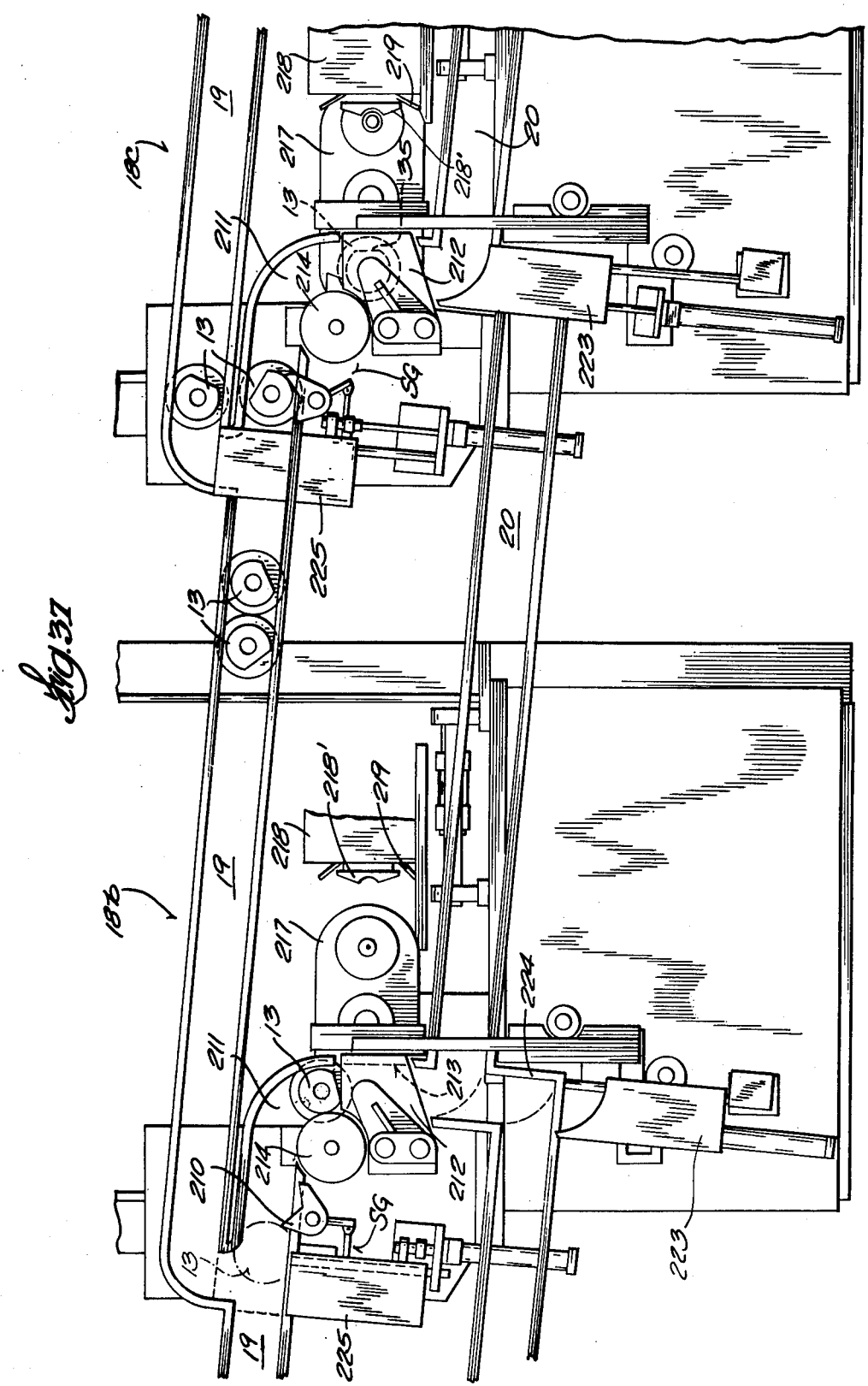

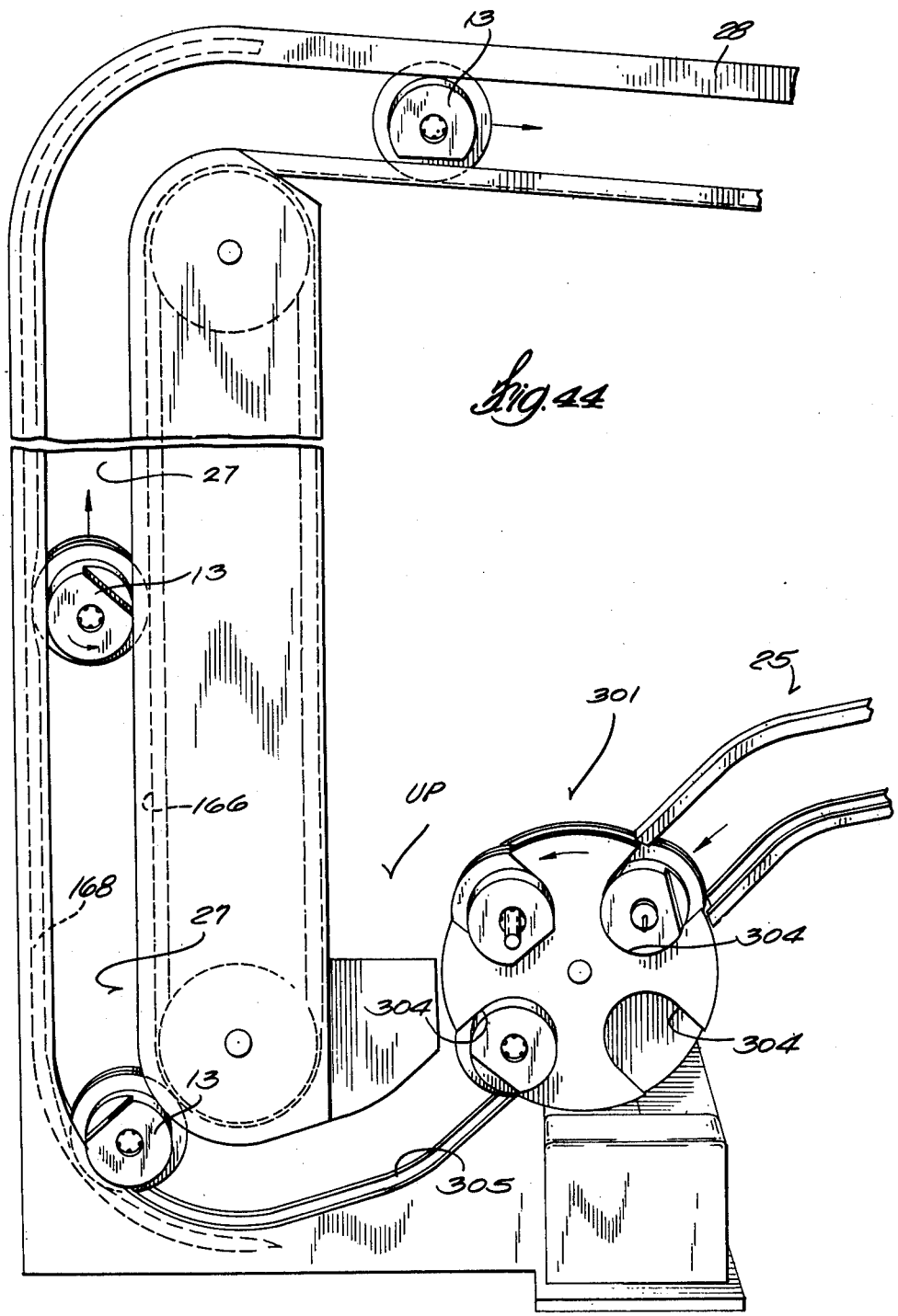

METHOD OF AND APPARATUS FOR AUTOMATIC PRODUCTION OF ARMATURES

This invention like that of the copending application Ser. No. 607,048 filed Aug. 22, 1975, now U.S. Pat. No. 3,980,184, of which this is a division, and which in turn was a division of Ser. No. 477,549, filed June 7, 1974, now U.S. Pat. No. 3,920,129, relates to a method of and apparatus for automatically assembling the components of multi-part articles and conveying the assembled articles successively to a number of work stations at each of which power actuated mechanism performs an operation upon the articles, which operations cumulatively result in the production of a finished product.

Broadly speaking, the objectives of this invention are the same as those of the Zepp, U.S. Pat. No. 3,734,314 issued May 22, 1973 to The Hoover Company of North Canton, Ohio. This patent is unquestionably the closest prior art requiring consideration in evaluating the patentability of the invention disclosed and claimed herein.

As will become apparent from the following disclosure and the appended claims, this invention constitutes a significant improvement upon that of the aforesaid Zepp patent and, by that improvement, overcomes serious deficiencies in the method and apparatus disclosed in the Zepp patent.

Although the present invention as a whole and certain constituent aspects of it, are no doubt useful in a number of different arts and for other purposes, the invention — like that of the Zepp patent — is primarily concerned with the automatic production of armatures for electric motors and will therefore be described in that context.

Those skilled in the art are well aware of the problems that have heretofore confronted manufacturers of electric motors in their efforts to lower the production cost of their product, and especially that fraction thereof represented by the production of the armatures.

An armature comprises a core assembly consisting of a stack of iron laminations, with coil receiving slots opening to its periphery and usually provided with shields of insulating material covering its opposite ends, and a commutator having a circle of terminals mounted on a common shaft. Coils of wire are wound into the slots of the laminated core and the leads that connect the coils are fused, or otherwise physically and electrically connected to the commutator terminals. Obviously, before the coils can be wound onto the core, the laminations comprising it must be assembled into a stack of the required height and then pressed onto the shaft along with the commutator. This is done automatically by an assembling machine designed for the purpose, and results in armature core assemblies ready to have coils wound thereon.

The winding of the coils is, of course, done on a well known winding machine, and the fusing of the coil leads to their respective commutator terminals is accomplished by a machine especially designed for the purpose, but which forms no part of this invention. When these operations are completed, the finished product, i.e. the armature, must be electrically tested and checked before it is passed on for incorporation in a motor. The machines or locations at which these different operations are performed can be regarded or identified as work stations, each of which performs its function most expeditiously and reliably. But no matter how efficiently and quickly the respective operations are performed at these work stations, the desired low production cost will not be achieved unless the armature core assemblies are automatically and quickly conveyed from the assembling machine to the winding machine, and unless the wound armatures are similarly carried from the winder to testing and checking stations in a way which assures proper presentation thereof to the successive work stations.

As taught by the aforesaid Zepp patent, the transfer of the articles — armature core assemblies and wound armatures — from station to station can be efficiently accomplished by inserting the articles into carriers that roll by gravity along downwardly inclined tracks. But this is not enough. The armature core assemblies and wound armatures must be in predetermined rotary orientation with respect to the work performing mechanism at the work stations as they are presented thereto, and that predetermined orientation requires that the armature core assemblies and/or wound armatures be in a certain position of rotation when they enter the work station.

For that requirement to be met, the carrier into which the armature core assemblies and the wound armatures are inserted for transport from work station to work station, must arrive at the work stations in a known or identifiable position of rotation which entails the provision of intelligence on the carriers by which rotation thereof can be interrupted in a defined position, and also locating means on the carriers by which the articles therein are held in a predetermined position of rotation with respect to the intelligence on the carriers.

The Zepp patent discloses neither intelligence on the carrier by which rotation thereof can be interrupted nor locating means to hold the articles in a predetermined position of rotation with respect to such intelligence on the carriers. In fact it does not even suggest a recognition of the need for these attributes.

It is therefore an important object of this invention to provide a conveyor system for presenting articles successively to a work station which system not only quickly brings the articles to the work station, but also assures that when presented thereto, the articles will be in a predetermined orientation with respect to the mechanism at the work station by which the work to be done at that station is performed.

More specifically, it is the purpose of this invention not only to provide a conveyor system in which the articles to be conveyed are inserted into axial cavities in identical cylindrical carriers with their center of gravity on the axis of the carriers so that the carriers with the articles therein can roll freely along downwardly inclined tracks, as in the aforesaid Zepp patent, but which in addition has each of the carriers equipped with rotation interrupting means by which the carriers can be held against rotation, and locating means by which the articles therein are held in a predetermined position of rotation with respect to the rotation interrupting means on the carriers.

Another object of the invention is to provide a conveyor system especially adapted for use in the automatic production of armatures for electric motors which employs carriers for the unwound and wound armatures that roll along downwardly inclined tracks from work station to work station, and which conveyor system is characterized by holding means at each work station that coacts with rotation interrupting means on the carriers and by such coaction assures a required orientation of the unwound and wound armatures with the mechanism at the work stations.

Still another object of the invention resides in the provision of improved transfer instrumentalities for a conveyor system of the character by which the articles being handled are transferred to and from the mechanism at the work stations by which different operations are performed, as for instance in the case of armatures for electric motors, the winding of the coils onto the armature core and the fusing of the coil leads to the commutator terminals, which transfer instrumentalities are characterized by the fact that they bodily move the carriers with the articles therein towards and from the mechanism at the work stations along defined rectilinear paths that are parallel to the axis of rotation of the carriers, and in the case of armatures, parallel to the axis of the armatures.

A further object of the invention is to provide certain of the aforesaid transfer instrumentalities with means to swing the carriers back and forth between positions in which their axes are horizontal as they must be to roll along the track, and positions in which their axes are vertical as required at some of the work stations, and to effect that change without losing the predetermined orientation of the carriers and the articles therein with respect to the mechanism at the work stations.

Since the invention is primarily concerned with the production of armatures, the manner in which the core laminations are formed into stacks of predetermined height for identical armature cores, constitutes a significant part of the invention, and in this connection the invention has as another of its objects to provide an improved lamination separator which completely eliminates any possibility of failure or malfunctioning of that mechanism as a result of the dimensional variations normally encountered in the laminations.

With these observations and objectives in mind, the manner in which the invention achieves its purpose will be appreciated from the following description and the accompanying drawings, which exemplify the invention, it being understood that changes may be made in the precise method of practicing the invention and in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 5 is a longitudinal sectional view through one of the carriers;

FIG. 6 is an end view of the carrier;

FIG. 7 is an exploded perspective view of the component parts of the carrier;

FIG. 8 is a cross sectional view through a portion of the carrier to illustrate a detail thereof;

FIG. 9 is a side view of the assembling machine that is located at the start of the production line;

FIG. 10 is an end view of the assembling machine;

FIG. 11 is a diagrammatic top view of the assembling machine;

FIG. 12 is a view partially in section and partially in elevation of that part of the assembling machine at which the required number of core-forming laminations arranged in a stack are separated from a supply thereof and deposited in pockets in the first of two turntables;

FIG. 13 is a longitudinal sectional view through part of the structure shown in FIG. 12;

FIG. 14 is a cross sectional view through FIG. 13 on the plane of the line 14—14;

FIG. 15 is a top view looking down on part of the structure shown in FIG. 13 and taken on the plane of the line 15—15;

FIG. 16 is a fragmentary sectional view showing a detail of the structure shown in FIG. 13;

FIG. 25 illustrates that portion of the assembling machine at which a transfer arm lifts bottom end laminations from a supply thereof and places them in the bottom of the pockets in the second of the two turntables;

FIG. 25a is a cross sectional view through FIG. 25 on the plane of the line 25a—25a;

FIG. 26 is a view through FIG. 25 on the plane of the line 26—26;

FIG. 27 is a view similar to FIG. 25 but showing the structure by which stack-shaft assemblies are inserted into the pockets of the second turntable to be added to the bottom end lamination already in those pockets;

FIG. 28 is a cross sectional view through FIG. 27 on the plane of the line 28—28;

FIG. 28a is a fragmentary sectional view showing a detail of the structure shown in FIGS. 27 and 28;

FIG. 29 is another view similar to FIG. 25 but showing the manner in which the top end laminations are added to the assemblies being built up in the pockets of the second turntable;

FIG. 30 is a cross sectional view through FIG. 29 on the plane of the line 30—30;

FIG. 31 is a view similar to FIGS. 25, 27 and 29 but showing the manner in which the commutators are added to the assemblies being built up in the pockets of the receiving turntable;

FIG. 32 is a cross sectional view through FIG. 31 on the plane of the line 32—32;

Figure 1:
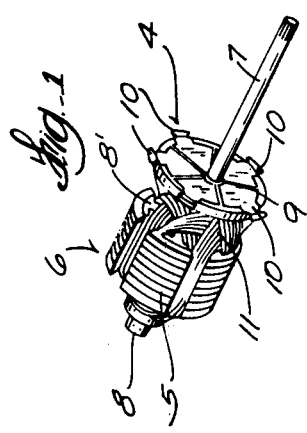
FIG. 1 is a perspective view of an armature of the type made on the production line of this invention.
Figure 33:
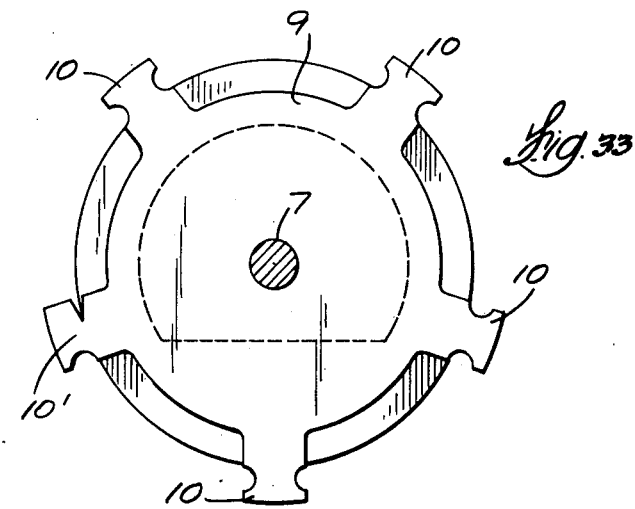
Figure 45:
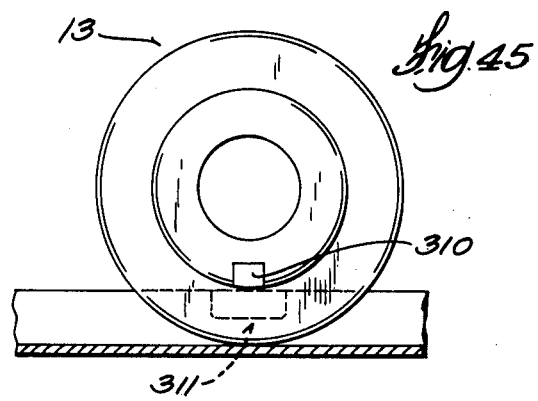
Figure 47:
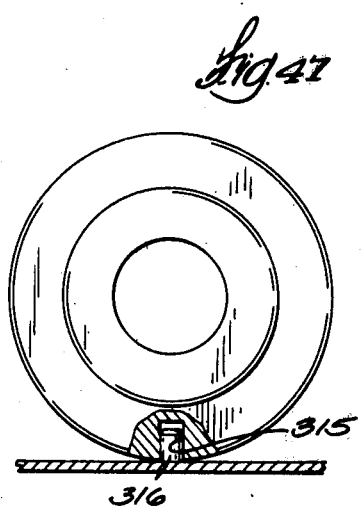
Figure 46:
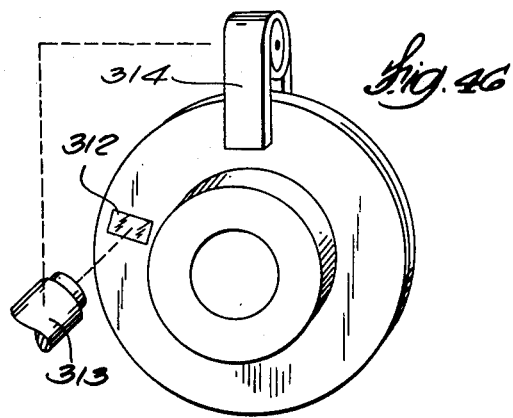
Figure 38:
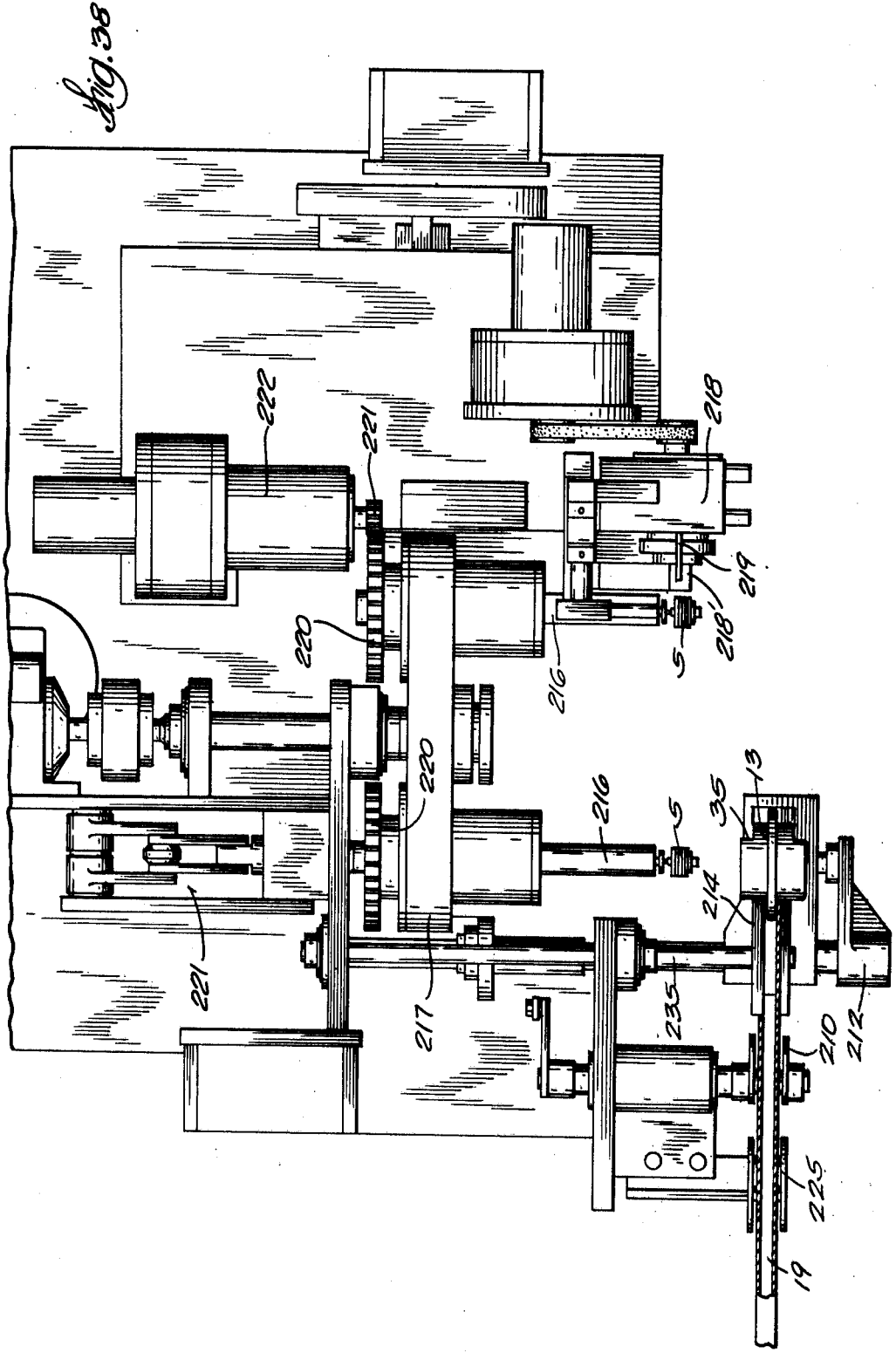
Figure 39:
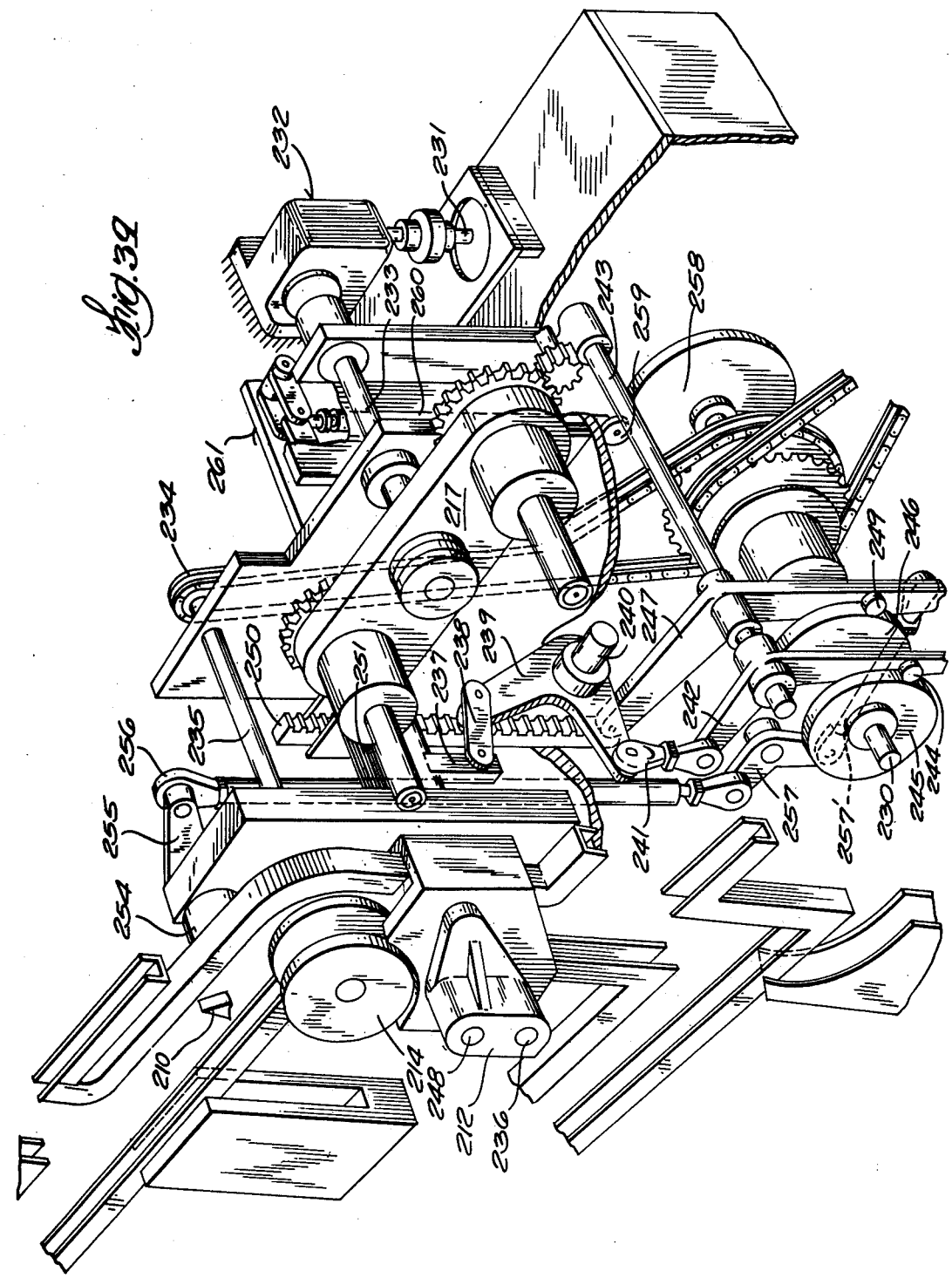
Figure 40:
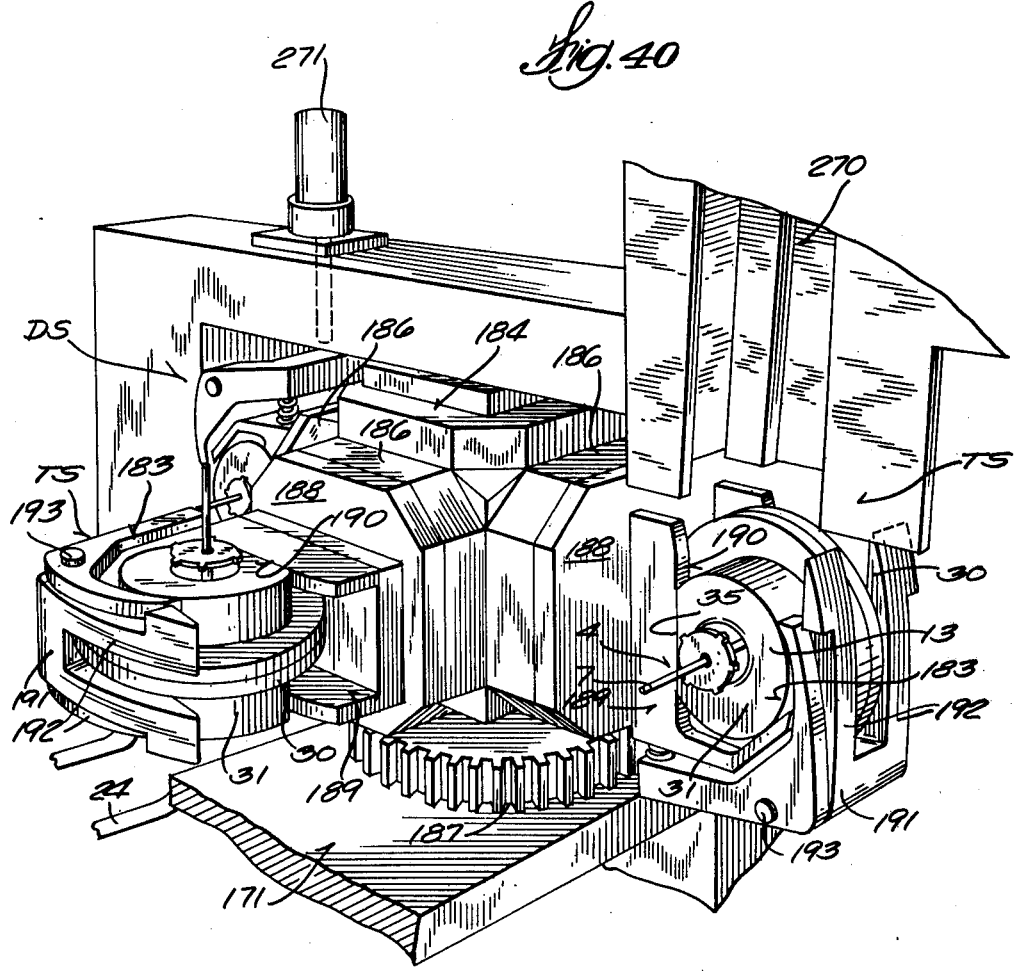
Figure 41:
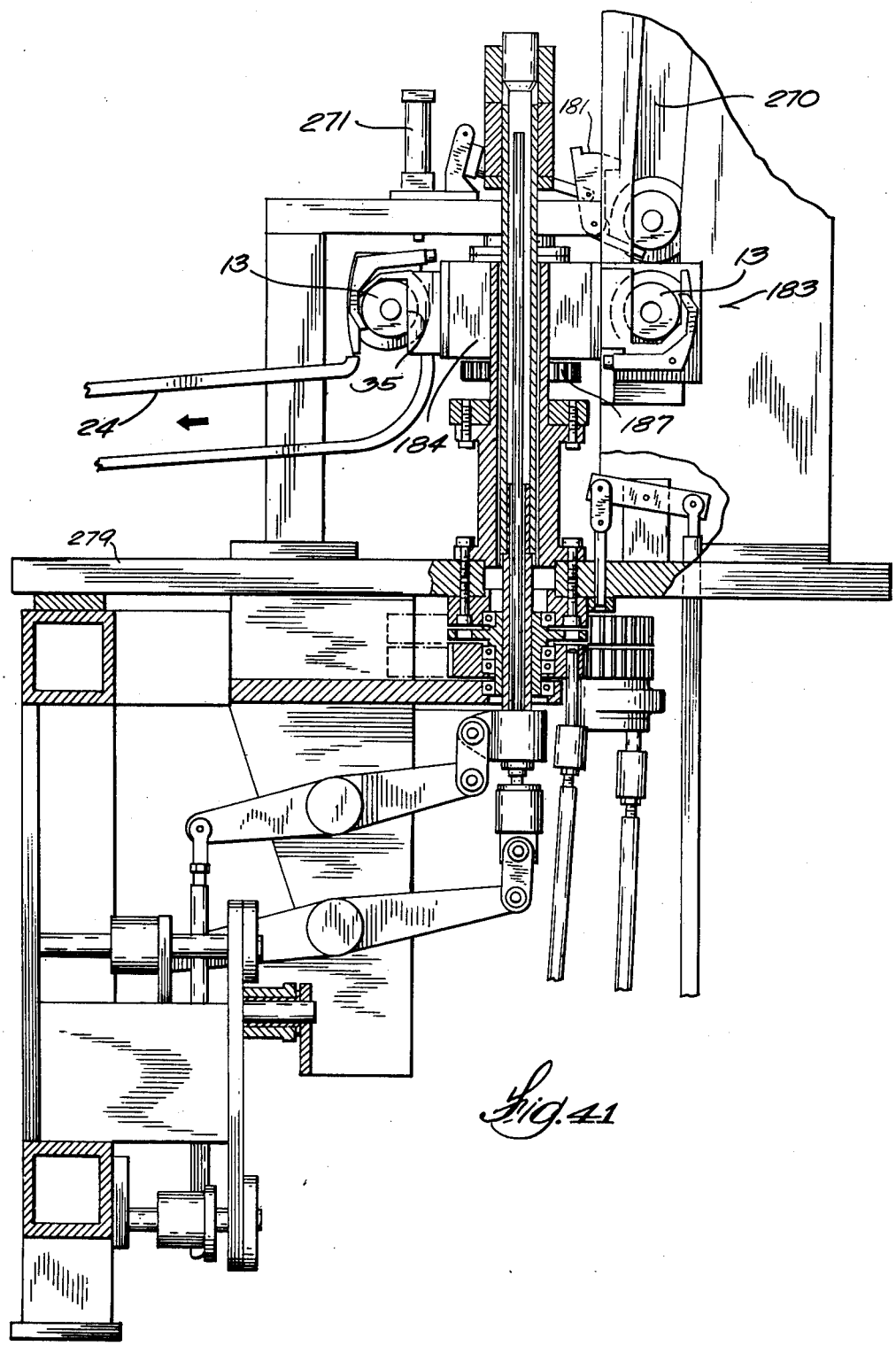
Figure 42:
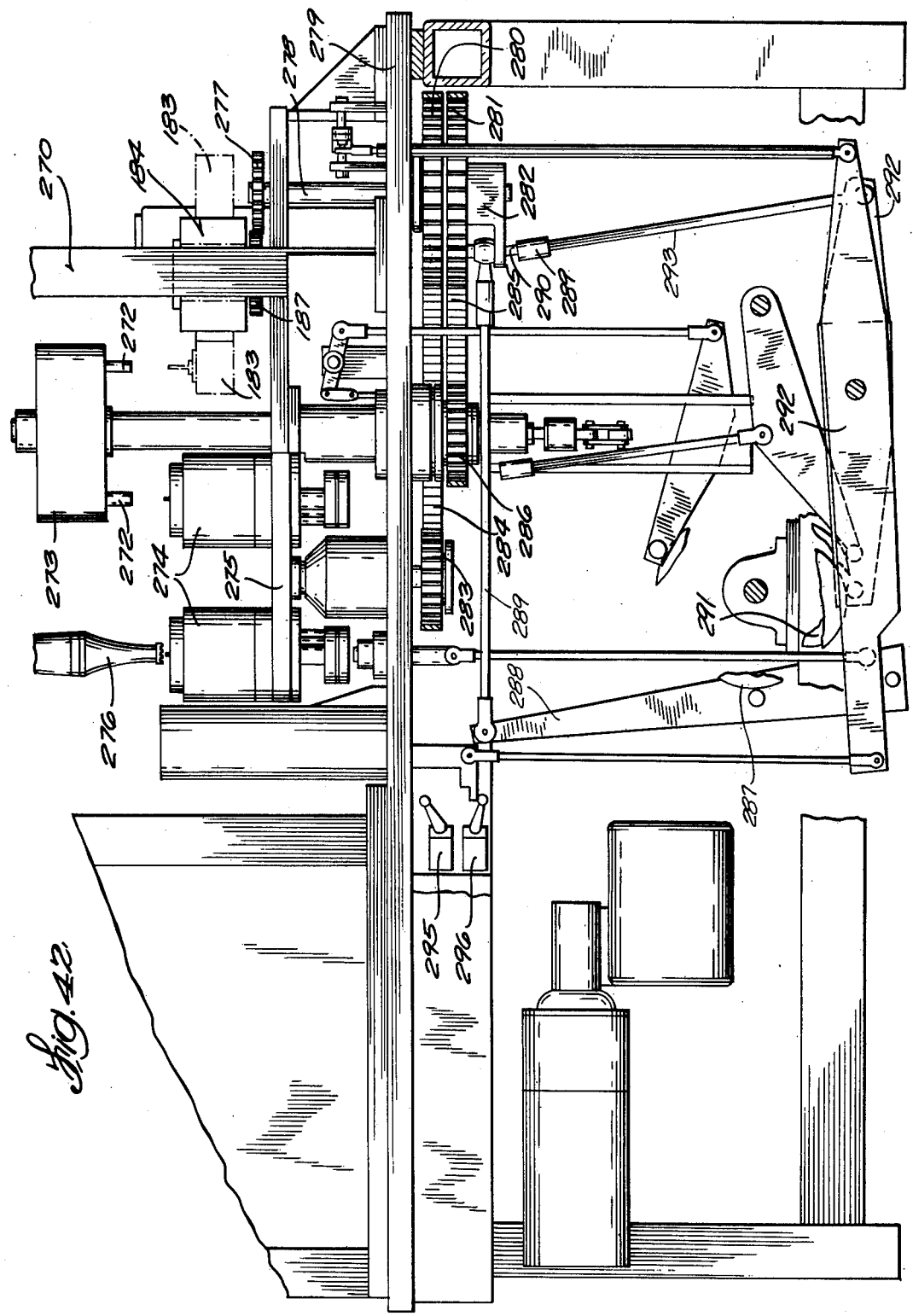
Figure 43:
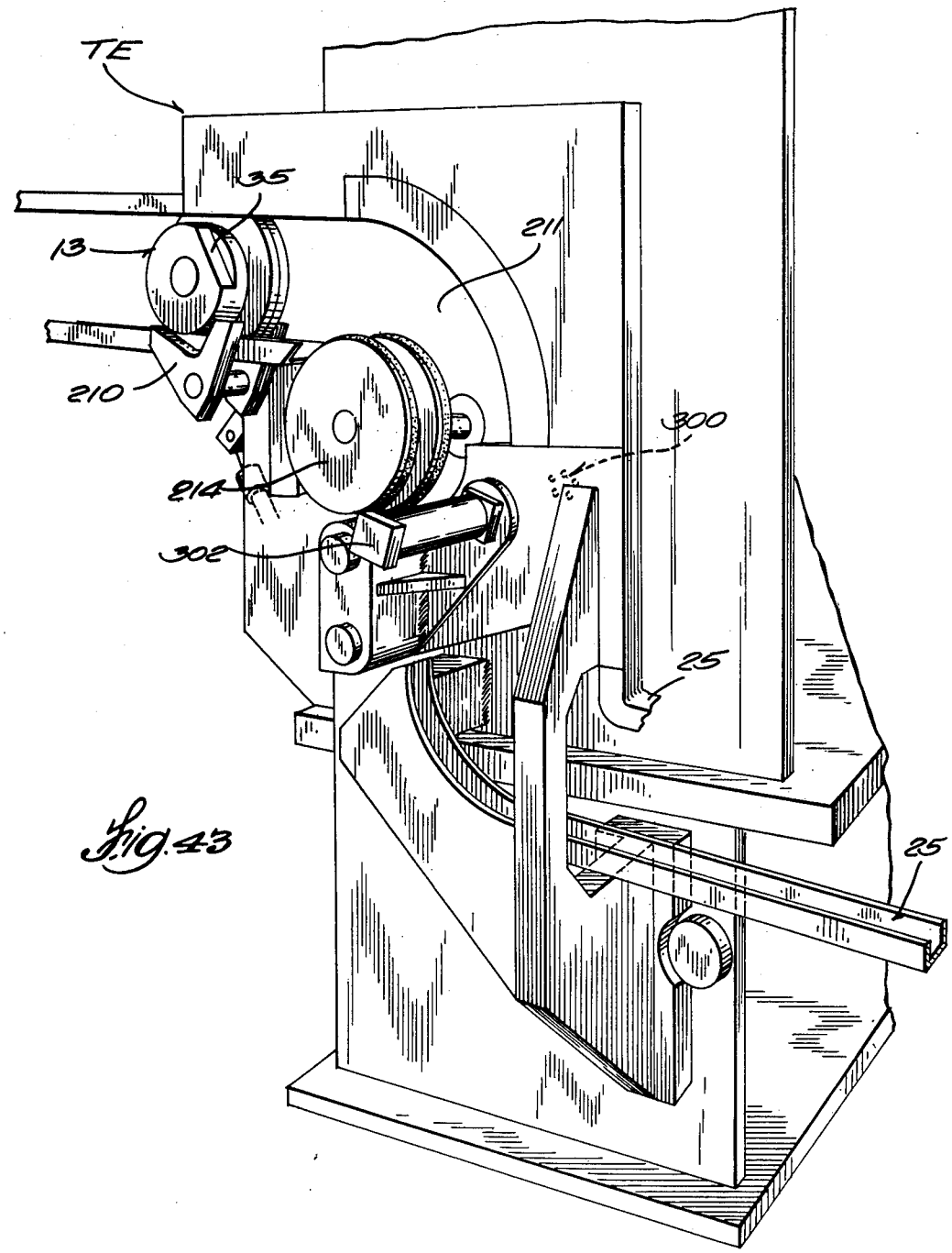

FIG. 33 on sheet 23 is a top view (on an enlarged scale) of one of the commutators showing the difference between one of its terminals and the rest;

FIG. 34 illustrates the transfer station at which completed armature core assemblies are transferred from the receiving turntable to the carriers by which they are brought to the winding machine of the production line;

FIG. 35 illustrates the structure by which empty carriers are presented to the transfer station shown in FIG. 34 and then, after receiving an armature core assembly, are elevated to the upper end of a downwardly inclined track along which they roll to the winding machine;

FIG. 36 is a detail sectional view through FIG. 35 on the plane of the line 36—36;

FIG. 36a is a cross sectional detail view through FIG. 35 on the plane of the line 36a—36a;

FIG. 37 is a side view of the first and second of a bank of four winding machines indicated in FIG. 1 and illustrating particularly the structure by which carriers with armature core assemblies therein are fed to and removed from the winding machines;

FIG. 37a on sheet 10 is a detail view illustrating a feature of the structure shown in FIG. 37;

FIG. 38 is a top view of one of the winding machines;

FIG. 39 is a perspective view of the structure by which the loaded carriers are handled in being fed to and removed from the winding machine;

FIG. 40 is a perspective view of the transfer mechanism by which carriers with wound armatures in them are taken from the track along which they are rolled from the winding machines, and are presented to the welding machine at which the leads of the armature coils are fused to the commutator terminals;

FIG. 41 is an end view of the welding machine with parts thereof broken away and in section;

FIG. 42 is a side view of the welding machine;

FIG. 43 is a perspective view of structure by which the loaded carriers are handled at the station where the armatures are tested;

FIG. 44 is a perspective view of the mechanism by which the completed armatures are removed from the carriers, and the empty carriers elevated to the track which brings them back to the assembling machines; and FIGS. 45, 46 and 47 illustrate other ways in which the carriers can be equipped with intelligence that enables their position of rotation to be identified and the carriers held against rotation.

Referring to the drawings, and bearing in mind that the invention is being described as applied to the production of armatures for electric motors, the numeral 4 (FIG. 1) designates a completed armature, illustrative of the type that can be produced at very high production rates on the production line of this invention. The armature comprises a core assembly consisting of a stack of identical iron laminations 5 that collectively form the core 6 of the armature, mounted on a shaft 7 between insulating end shields 8'—8' (hereinafter referred to as top and bottom end laminations) and a commutator 9 also mounted on the shaft 7 and having circumferentially spaced terminals 10. Coils of wire 11 wound into longitudinally extending slots in the core 6 with the wire leads that connect the successively wound coils, physically and electrically connected to the commutator terminals complete the armature.

THE PRODUCTION LINE-GENERALLY

Figure 2:
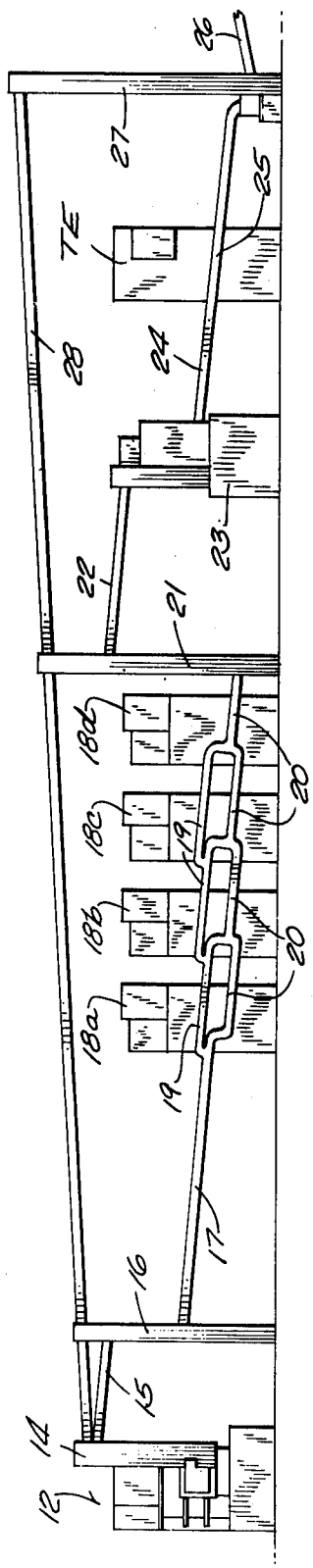
FIG. 2 is a side view at a very small scale and rather diagrammatic, of the entire production line.

In accordance with this invention the component parts of the armature core assembly are automatically assembled on an assembling machine 12 schematically depicted in FIG. 2, and as the assemblies are completed, they are inserted into cylindrical carriers 13 (FIGS. 5–8). The loaded carriers 13, upon leaving the assembling machine, are conveyed by an elevator 14 in a manner to be described, to the top of a downwardly inclined track 15, along which the carriers roll to a descending elevator 16 which brings the loaded carriers to a downwardly inclined track 17 that leads to a bank of winding machines 18 a, b, c and d. A number of winding machines are employed since the winding of the coils onto the armature core assemblies requires more time than does the automatic production of the armature core assemblies on the machine 12.

By means of automatic switching gear, to be later described, a loaded carrier approaching a "busy" winding machine at which a coil winding operation is in progress, is caused to bypass that machine and proceed along a track section 19 or a succession thereof to the next winding machine that is available to accept an unwound armature core assembly and wind coils onto it.

Upon arriving at an "available" winding machine, a carrier 13 with an unwound armature cord assembly in it, is moved axially to an unloading position at which the assembly therein is transferred from the carrier to the winding machine and an armature that has just been wound by that machine is inserted into the carrier.

The carrier with the just-wound armature in it, is now deposited on an adjacent lower track section 20 along which, or along a succession of which, the carrier rolls to an elevator 21. This elevator lifts the loaded carrier to the top of another downwardly inclined track 22, along which it rolls to a welding machine 23. Here the wire leads that connect the successively wound coils of the armatures, are physically and electrically connected to the terminals of the commutator. Since this operation requires the wound armatures to be removed from the carriers, the welding machine incorporates means for removing the armatures from the carriers and reinserting them after the welding operation.

Upon leaving the welding machine the carriers with the now completed armatures in them, are conveyed by the carriers rolling down a track 24 to a testing station TE where they are tested for possible "shorts" and, if found satisfactory, are conveyed by their carriers rolling down a track section 25 to a discharge station at which the acceptable armatures are removed from their carriers and deposited on a conveyor 26 that carries them to the location at which they are assembled into electric motors.

Armatures that do not meet the continuity test are displaced from their carriers and suitably handled as rejects.

An elevator 27 lifts the empty carriers 13 to the top of an elevated downwardly inclined track 28 along which they roll back to the assembling machine 12.

THE CARRIERS

Figure 3:
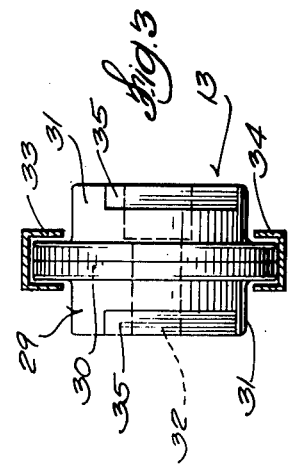
FIG. 3 is a side view of one of the carriers in which the armature core assemblies and the finished armatures are received, on one of the tracks along which the carriers roll to move their contents from station to station, the track being shown in cross section.

The carriers 13 are all alike in size and shape, size being dictated by that of the articles to be conveyed. Each carrier is a cylindrical body 29 with a middle flange 30 flanked by a pair of smaller diameter hubs 31. The body has a cavity 32 into which the article to be conveyed — in this case an unwound armature core assembly or a wound armature — is inserted. The carrier rolls on the circular periphery of its middle flange 30, and the tracks along which it rolls are formed by parallel opposing upper and lower channel-shaped rails 33 and 34 (FIG. 3) which embrace the middle flange 30 and thereby keep the carrier "on the track". Obviously, the space between the webs of the track-forming channels must be somewhat greater than the diameter of the middle flange of the carrier to permit the carrier to roll freely.

The most significant feature of this invention undoubtedly resides in the fact that the carriers 13 have "intelligence" on them by which their position of rotation can be identified and by which they can be held against rotation. The form in which this intelligence is provided is susceptible to modification, as will be shown, but a very simple and practical way of supplying that intelligence is by a flat surface 35 in the circular periphery of at least one of the two hubs 31. Where, as is preferable, both of the hubs 31 have such flat surfaces 35, they are coplanar and lie in a plane that forms a chord to the circular peripheries of the hubs 31 and, of course, also the middle flange 30. These flat surfaces result from a stepped formation at the outer ends of the hubs, which also forms risers 35' at the junction of the noncircular outer end portions of the hubs with their circular inner portions.

Wherever it is required to have predetermined rotary orientation of the conveyed articles — as, for instance, when an operation is to be performed on an armature core assembly or armature — that orientation is assured by holding the flat surfaces 35 on the carriers in engagement with flat surfaced stationary guides, to be later described; and by always inserting the articles into the carriers in the same known rotary orientation with respect to their flat surfaces 35. In the production of armatures, that required placement is accomplished at the assembling machine, as will be described, but before reaching that point it would be well to describe, in detail, the construction of the carriers.

By reference to FIGS. 5 through 8 (sheet 2) it will be seen that the body of the carriers consists of a pair of mating cup-shaped sections 36 that are mirror images of each other and are joined on the median plane of the middle flange 30.

Nested within the body formed by the two cup-shaped sections 36 is a cylindrical sleeve 38, the bore of which forms the cavity 32 into which the articles to be conveyed are inserted. To hold the sections 36 in proper relative relationship with their flat surfaces 35 coplanar, each has a key 39 that engages in a keyway 40 in the sleeve as the parts are assembled.

Figure 4:
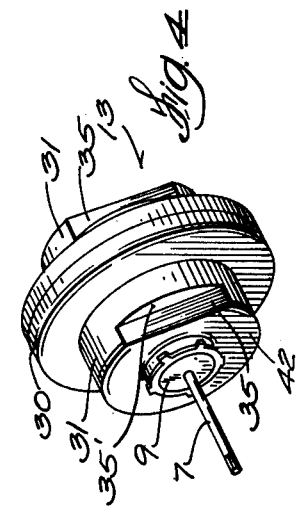
FIG. 4 is a perspective view of one of the carriers showing the same with an armature therein.

Since the carriers are designed to receive the armature shown in FIG. 1, one end of the cavity-forming bore of the sleeve 38 is counterbored, as at 41. This counterbore is of a diameter and depth to snugly receive and axially locate the core of the armature in a position in which its commutator is spaced from the adjacent end 42 of the carrier and with its shaft projecting from the carrier, as seen in FIG. 4.

The axial position of the armature in the carrier is defined during its insertion by the engagement of the core with the shoulder 43 formed by the bottom of the counterbore 41; and a plurality of parallel pins 44 that project radially into the counterbore 41 engage the edges of the winding slots of the armature core to hold the armature against rotation with respect to the carrier. Since there are five winding slots in the present armature, there are five pins 44 spaced apart 72°.

The pins 44 are seated in holes 45 formed in the sleeve and so located with respect to its axis that they communicate with the counterbore through longitudinally extending openings somewhat narrower than the diameter of the pins and, since the holes are larger in diameter than the pins, the pins have a degree of lateral freedom, as shown in FIG. 8. This enables the pins to accommodate themselves to the core of the armature as it is inserted into the carrier.

An elastic band 46 seated in an annular groove 47 in the sleeve 38 yieldingly draws the pins towards the axis of the carrier and thus causes them to frictionally grip the core of an armature inserted into the carrier. To enable the elastic band to engage the pins, the annular groove 47 is deep enough to open into the holes in which the pins are seated.

All component parts of the carrier are formed of insulating material, so that an armature therein can be electrically tested for continuity of its coils without removing the same from the carrier. The sleeve 38 and the cup-shaped sections 36 which form the body of the carrier, are preferably molded plastic parts and, in practice, the sections 36 are cored out for lightness and economy of material, in accordance with standard plastic molding techniques.

THE ASSEMBLING MACHINE (FIGS. 9-32)

The assembling machine, designated by the numeral 12 in FIG. 2, comprises two cooperating units identified generally by the numerals 50 and 51 in FIG. 9, where both units are shown mounted on a common base 52. The unit 50 forms the core laminations 5 into stacks of the prescribed number and inserts the shafts of the armatures into the stacks. To do this, the unit 50 has a turntable 53 mounted to be rotatably indexed in 60° increments about a vertical axis. This table has a bottom plate 54 that is drivingly connected with a main drive shaft 55 in the bottom of the base 52 through conventional power transmission and indexing means (not shown), and a top plate 56 that has six cylindrical pockets 57 arranged in a circle near its periphery. Since the diameter of these pockets is determined by that of the laminations that form the armature core, the top plate 56 is removably fixed to the bottom plate to allow for its replacement when a different diameter armature is to be made.

With each index of the turntable 53, one of its pockets 57 is aligned with a lamination magazine 58 thereabove. The magazine is essentially a vertical tube of a length sufficient to hold a large number of laminations, and to assure an adequate supply of laminations at all times, there are several such magazines mounted in a turret 59 positioned alongside the turntable. Hence, by properly indexed rotation of the turret, one of the magazines is always positioned to have the pockets 57 aligned therewith as indexed rotation of the turntable brings the pockets into lamination receiving position. The manner in which the magazine turret is indexed is of no consequence to this invention and hence has not been shown.

However, it is significant that the turret have a bottom plate 60 (FIG. 12) in which the magazine tubes 58 are set and which slides across the top of a stationary plate 61 that has at its underside a lamination feeder, designated generally by the numeral 62. The laminations drop through the lamination feeder into each pocket 57 as indexed rotation of the turntable brings it into alignment with the lamination feeder, it being understood that the stationary plate 61 has a hole through which the laminations pass from the magazine into the lamination feeder.

In each of the cylindrical pockets 57 is a plunger 63 which is reciprocable between a raised position in which its top is flush with the top surface of the turntable and a lowered position which determines the height of the stack of laminations contained in the pocket. A pin 64 projecting from the bottom of the plunger through a hole in the bottom plate 54 of the turntable, rides up a stationary cam 65 positioned in the circular path of the pin as indexed rotation of the turntable brings its pocket into loading position and thereby raises the plunger to its topmost position.

As the advancing turntable carries the pin 64 off the top of the cam and comes to rest in the loading position, it sets the pin onto the end of a plunger 66 which at that moment is in its elevated position to which it has been raised by an air cylinder 67. By controlled operation of the air cylinder, the plunger 66 is then retracted to allow the plunger 64 to descend and thereby bring about the loading of the pocket with laminations. An adjustable stop 68 limits the descent of the plunger 66 and, in so doing, governs the number of laminations that enter the pocket.

Timing controls (not shown) initiate indexing of the turntable as soon as the predetermined number of laminations have been dropped into a pocket, and as the turntable begins its indexing rotation and carries the just-loaded pocket away from the loading position, the topmost lamination in the stack therein is stripped or separated from the laminations above it.

Before this invention, it was most difficult to strip or separate the desired number of laminations from the column contained in the magazine. In the hope of achieving that objective, the discharge mouth of the magazine was spaced from the top of the turntable a distance less than the thickness of a lamination, but because of the inevitable variations in thickness of the laminations, the height of a given stacked number of laminations was not always the same. Time and again the topmost lamination in the stack would be partially in the pocket and partially still in the magazine and, when that happened, the initial indexing motion of the turntable resulted in jamming the turntable indexing mechanism and causing serious damage to the machine.

The present invention completely eliminates that objectionable consequence by its provision of the lamination feeder 62 and the manner in which it is mounted. Extending vertically through the lamination feeder is a bore 69 of a size to allow the stacked laminations leaving the bottom of the magazine to freely descend to and drop from the bottom of the feeder. The feeder is pivotally mounted by a pin 70 that has its ends received in a pair of ears 71 depending from the table 61, and is yieldingly held by a spring 72 in a normal position defined by the engagement of a stop 73 with the underside of the table 61. In that normal position, the bore 69 through the feeder is coaxial with the magazine and the pocket 67 in lamination receiving position.

Note that the axis of the pivot pin 70 is transverse to the direction the turntable carries the pockets, and that it is upstream of that movement with respect to the bore 69. Hence, as shown in FIG. 13, indexing motion of the turntable while a lamination is both in the pocket and in the bore 69, will simply cause the lamination feeder to rock on its pivot against the thrust of the spring 72. As that occurs, the bottom of the lamination feeder swings upwardly away from the top of the indexing table allowing the "caught" lamination to free itself from the mouth of the feeder.

The structure just described is not limited to use with laminations of any particular configuration — even non-circular laminations can be successfully separated thereby — but for the core of the armature shown in FIG. 1, wherein the winding slots have a re-entrant cross sectional shape and the individual laminations accordingly have five T-shaped arms, it is advantageous to provide the bore 69 in the lamination feeder with a key 74 that is T-shaped in cross section, to engage the underside of the heads of two adjacent T-shaped arms on all of the laminations in the feeder.

Figure 17:
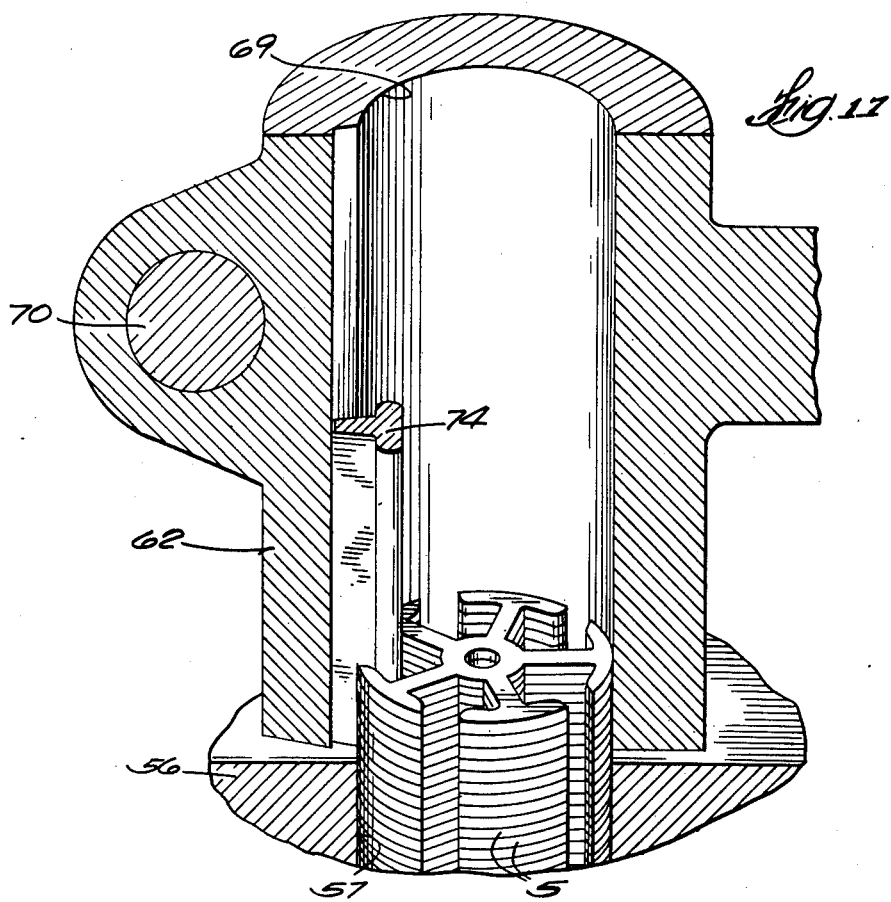
FIG. 17 is a perspective view on an enlarged scale, partially in section and partially in elevation, to better illustrate the manner in which the stacked laminations are fed from a supply thereof into pockets in the first of the two turntables shown in FIG. 12.
Figure 19:
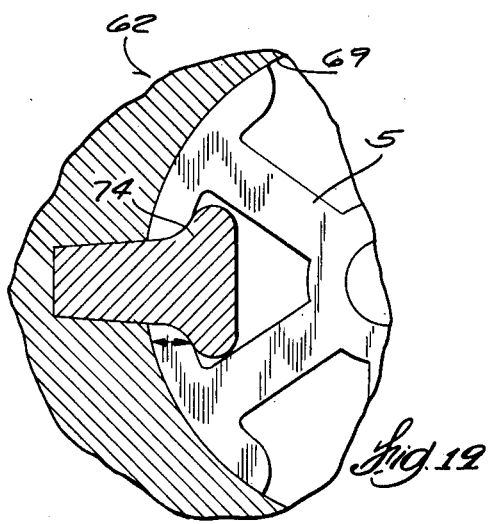
FIG. 19 is a sectional view through FIG. 18 on the plane of the line 19—19.
Figure 18:
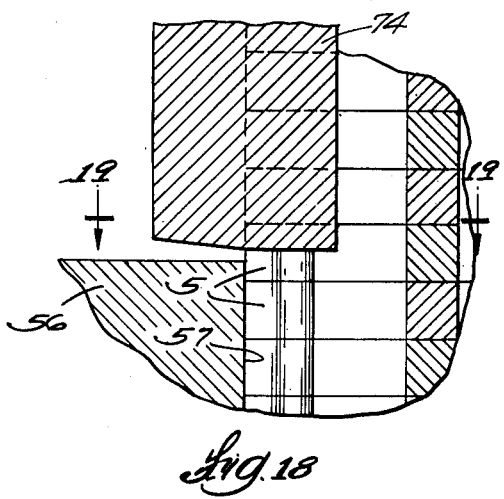
FIG. 18 is a fragmentary detail view at still a larger scale to illustrate an aspect of the lamination separating feature of this invention.
Figure 20:
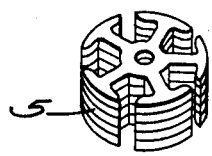
FIGS. 20 through 24 are perspective views showing the different stages in the formation of the armature core assemblies.

As best seen in FIGS. 17 and 18, this T-shaped key may be integral with the body of the feeder or secured in a groove formed in the wall of the bore 69. In any event, it is at that side of the bore that is nearest the axis of the pivot 70 and hence is upstream with respect to the movement of the pocket 57 as the turntable is indexed. Accordingly, in the event a lamination is trapped between the advancing pocket and the mouth of the lamination feeder, the opposing forces act on closely adjacent parts of the lamination, as indicated by the arrows in FIG. 19. This has the advantage of minimizing the possibility of the trapped lamination being bent before it is released from the mouth of the feeder.

The provision of the T-shaped key also facilitates holding the effective clearance between the underside of the feeder and the top of the turntable to less than the thickness of a lamination, since it is only the clearance between the bottom end of the key and the top of the turntable that is critical.

The T-shaped key in the bore 69 of the lamination feeder aligns with conventional keys 75 and 76 respectively, in the magazine and the pockets 57 so that at all times the stacked laminations will be held against relative rotary displacement.

Figure 21:
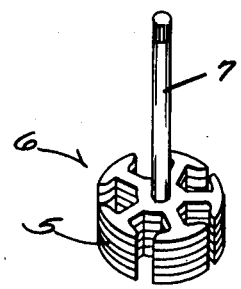

With each index of the turntable, the pocket into which a stack of laminations has just been loaded, is first presented to a stack height checking station, which has not been illustrated, being unnecessary for an understanding of the invention. The next index of the turntable carries that pocket with the correct number of laminations in it, to a shaft inserting station indicated generally by the numeral 81 in FIG. 11. Here an armature shaft 7 is taken from a shaft feeder SF (FIG. 11, sheet 5) and pressed into the stack of laminations. Since the mechanism by which this operation is performed is conventional, a detailed description of it is not needed. FIG. 21 (Sheet 8) illustrates the shaft-stack subassembly.

At a checking station (not shown) to which the assembled stack and shaft are brought by the next index of the turntable, that partial or subassembly is checked to determine if, in fact, a shaft has been inserted into the stack of laminations. If one has, the operation of the machine proceeds, but if no shaft is present, control mechanism (not shown) functions to stop the production line and actuate a signal that indicates the source of the difficulty.

The next index of the turntable carries the assembled stack and shaft to a transfer station, generally identified in FIG. 11 by the numeral 81. Here this subassembly leaves the unit 50 of the assembling machine and is taken over by the unit 51.

The unit 51 also has a turntable, identified by the numeral 82, mounted for indexed rotation about a vertical axis in 60° increments and equipped with six equispaced pockets 83 around its periphery (FIGS. 25, 29, 31, 34). These pockets carry the progressing armature core assembly step-by-step from the transfer station 81 to a loading station 84 (FIG. 11) where the completed armature core assembly is inserted into one of the carriers 13. Since the size of the pockets 83 is determined by the diameter of the armature core, the pockets are preferably provided by appropriately bored inserts set into holes in the turntable 82.

Power to effect indexing rotation of the turntable 82 is taken from the main drive shaft 55 through gears 55' and a transmission unit 85 (FIG. 9). This transmission unit not only produces the incremental rotation of the turntable 82 but it also imparts up and down motion to a pair of superimposed horizontal non-rotatable discs 86 and 87, the function of which will be described later.

The manner in which the transmission unit 85 effects incremental rotation of the turntable 82 and vertical reciprocation of the discs 86 and 87 forms no part of this invention, and hence has not been illustrated. Suffice it to say that, through appropriate mechanism, the vertical reciprocation of the discs is coordinated with the indexed rotation of the turntable.

At the transfer station 81 and at the loading station 84 — which are diametrically opposite one another with respect to the axis of the turntable — and also at three other stations spaced around the circumference of the turntable, there are transfer arms 88 with hands 89 at the opposite ends thereof by which the parts to be handled by the transfer arms are grasped.

Each transfer arm is mounted at its respective station on a spindle 90 (FIG. 34) for rotation about a vertical axis, with its hands 89 projecting downward and equispaced from the axis about which the arm rotates. The lower ends of the spindles are slidably splined to the hubs of gears 91 which, in turn, are journalled in bearings 92 fixed to a stationary base plate 93 that is secured to the housing of the transmission unit 85. The upper ends of the spindles are journalled in combination thrust and radial bearings 94 that are mounted in the lower disc 87. Accordingly, the spindles and the transfer arms thereon are both rotatable and axially movable - the later motion being imparted to the spindles by up and down motion of the disc 87.

To rotate the spindles, the gears 91 to which they are slidably splined, mesh with a large gear 95 that rotates in unison with the turntable 82 as the latter is indexed by the transmission unit 85. The ratio of the gears 91 and 95 is such that with each 60° index of the turntable, the gears 91 — and hence the transfer arms — rotate 180° between positions in which the transfer arms are radial to the axis of the turntable.

The five stations at which transfer arms are located are identified in FIG. 11 by the letters A, B, C, D and E. At a sixth station F, there is no transfer arm. These stations are spaced 60° apart.

Attention is directed to the fact that in FIG. 9, for the sake of clarity, three of the five transfer arms and their associated parts have not been shown. Only the transfer arms at the diametrically opposite stations B and E are shown.

At station A, the part being handled is the insulating shield 8' which covers the end of the stack of armature core laminations remote from the commutator, and hereinafter referred to as the bottom end lamination. At this station the transfer arm takes a bottom end lamination from the discharge station 96 of a conventional vibratory feeder 96a and places it in a pocket 83 of the turntable 82. FIG. 25 illustrates this latter operation.

At station B — which is the transfer station 80 — the stack-shaft subassemblies are transferred from the turntable 53 to the turntable 82. FIG. 27 illustrates one such subassembly about to be lifted out of a pocket 57 in the turntable 53, and shows a bottom end lamination in a pocket 83 in the turntable 82.

At station C, the other insulating shield 8 — hereinafter termed the top end lamination — is transferred from the discharge station 97 of a conventional vibratory feeder 97a to a pocket 83 of turntable 82 and, in so doing, impales that top end lamination onto the shaft of the armature core subassembly seated in the pocket. FIG. 29 illustrates this operation.

At station D, the transfer arm removes a commutator from the discharge station 98 of a conventional vibratory feeder 98a and adds it to the armature core subassembly in the adjacent pocket 83 of the turntable 82. FIG. 31 illustrates the commutator just placed on that subassembly.

At station E, one of the hands of the transfer arm at this station, upon descent of the transfer arms, grasps the shaft of the just-completed armature core assembly and — by its elevation — that transfer arm lifts the armature core assembly from the turntable 82. During the next index of the turntable 82 and the concomitant 180° rotation of the transfer arm at station E, that armature core assembly is brought to a transfer position at which it aligns with a waiting carrier to be shoved down into that carrier during the next descent of the transfer arms.

Nothing takes place at station F and there is no transfer arm at this station. This assures that the turntable pockets 82 will be empty when they reach station A.

Because of the differences in shape and size of the parts handled by the five transfer arms, their hands are necessarily different. Thus, as shown in FIG. 25, the identical hands 89 of the transfer arm at station A — where the bottom end laminations are lifted from the source thereof and placed in the bottom of the pockets 83 in turntable 82 — each comprises a stem 99 fixed to and projecting down from the transfer arm. On the lower end portion of this stem, which is reduced in diameter, there are three identical gripper fingers 100 seated in longitudinally extending grooves 101. The upper ends of these fingers have bosses that seat in sockets 102 formed by an increase in depth of the grooves and, at their lower ends, the gripper fingers have inwardly directed claws 103 that underlie the bottom of the stem. An elastic band 104 encircling the stem and occupying an annular groove in the stem, yieldingly biases the fingers radially towards the axis of the stem and causes the claws to snap under the edge of a bottom end lamination in position to be picked up at station A as the transfer arm descends.

Return of the transfer arm to its elevated position and rotation thereof through 180° places the bottom end lamination directly above the adjacent empty turntable pocket 83 at station A.

As shown in FIG. 25, descent of the transfer arm then inserts that bottom end lamination that had been picked up during the previous cycle, into the empty turntable pocket 83 at station A. With the bottom end lamination thus inserted into the pocket, it must be held there as the transfer arm rises. This is done by a stripping pin 105. This pin is slidably received in a bore extending axially through the stem 99 and is held against relative axial motion with respect to the stem by being yieldingly held against a cap 106 that closes the hole in the transfer arm in which the stem is secured. It is held in that position by a spring 107 confined between the bottom of a counterbore in the top of the stem and the underside of a flange 108 on the pin.

The upper end of the pin projects through a hole in the cap and provides a "push button" against which a downward holding force is applied to the pin, in a manner to be described, and hence to the bottom end lamination in the pocket, as the transfer arm rises.

At the transfer station B, where the stack-shaft subassembly shown in FIG. 21 is lifted from the turntable 53 and transferred to the turntable 82, the hands of the transfer arm are as shown in FIG. 27. Here each of the hands comprises a tubular shell 109 seated in a counterbored hole in the transfer arm, and a plunger 110 slidable in the shell and yieldingly maintained by a spring 111 in a projected position defined by interengaging abutments on the plunger and shell. A bore 112 with a slightly enlarged mouth at its bottom, extends axially through the plunger, and projecting down into the upper end of this bore is a pin 113 that has a stepped diameter head 114 at its top. The smaller diameter portion of this head projects slidably through a cap 115 secured to the top of the arm and extending down into the counterbored hole to hold the shell 109 in place. The bottom of the cap thus forms a fixed seat against which the spring 111 reacts in maintaining downward pressure on the plunger 110.

A lighter spring 116 reacting between the top of the plunger and the underside of the stepped diameter head 114, yieldingly holds the pin 113 in a raised position in which its upper end portion provides a "push button" by which the pin can be depressed for a purpose to be described.

In effecting transfer of a shaft-stack subassembly from the turntable 53 to the turntable 82, the transfer arm lowers its hands towards the adjacent pockets in both turntables. As the hand which aligns with the pocket 57 in the turntable 53 descends, the armature shaft enters the bore 112 in the plunger 110 and the bottom of the plunger engages the top of the stack of laminations in the pocket, causing the plunger to rise against the force of the spring 111. A pin 117 projecting from the bottom of the plunger, projects into one of the slots in the stack of laminations to maintain rotational alignment between the plunger and the stack.

Upon completion of the downstroke of the transfer arm, a clutch consisting of three inwardly biased balls 118 that occupy radially extending holes 119 in the plunger 110, frictionally grips the armature shaft with sufficient force to lift the stack-shaft subassembly out of the pocket 57 as the transfer arm rises. The holes 119 in which the balls are seated do not open fully into the bore 112, so that a lip is left at the radially inner ends of the holes against which the balls are held by an elastic band 120 received in an annular groove in the plunger, and to avoid requiring the annular groove to be so deep that it weakens the plunger, spacers 121 are interposed between the balls and the elastic band. (FIGS. 28 & 28a)

Obviously, as the armature shaft is pushed into the grip of the balls, they leave the seats formed by the lips at the inner ends of the holes 119.

The insertion of the shaft-stack subassembly into the pocket 83 after the transfer arm has swung 180° to bring that subassembly into line with the pocket, is effected in the following manner. As the transfer arm descends, the bottom end of the armature shaft enters the socket in the bottom end lamination that had been placed in the pocket 83 at station A by the preceding cycle, and the flanges of that end lamination enter the slots in the stack. With continued descent of the transfer arm, the plunger 110 bottoms on the stack and, by compression of the spring 111, the laminations are tightly pressed together and held down during initial elevation of the transfer arm. But before that elevation of the transfer arm takes place, the "push button" 114 is forcefully depressed in a manner to be described and, by that forceful depression, the pin 113 bearing against the top end of the armature shaft, drives the latter solidly into the socket in the bottom end lamination.

Figure 22:
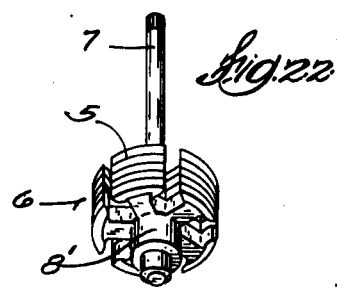

The "push button" 114 is retained in its depressed condition as the transfer arm begins its upstroke, with the result that the armature shaft is stripped from the grasp of the three ball clutch, so that the shaft-stack subassembly with the bottom end lamination assembled thereto, as shown in FIG. 22, remains in the bottom of the pocket 83 ready to receive the top end lamination which takes place at station C.

The hands of the transfer arm at station C are similar to those on the arm at station A, to the extent that they have three fingers 122 (FIGS. 29, 30) that reach down and snap over the edge of a top end lamination in place at the discharge station 97 as the transfer arm descends, but in this case the grooves in which the fingers are seated are in a plunger 123 that is axially movably received in a shell 124 fixed to and projecting down from the underside of the transfer arm. A pair of elastic bands 125 yieldingly hold the fingers in their operative positions.

Slidably received in a bore 126 in the plunger 123 is a stem 127 that has an axial bore to receive the armature shaft. The plunger is spring biased downward to bear against the top end lamination as it is applied to the shaft-stack subassembly. To strip the top end lamination from the spring fingers during ascent of the transfer arm, the "push button" at the top of the stem 127 is restrained against upward movement as the transfer arm begins its upstroke, to thereby maintain downward pressure on the top end lamination.

Figure 23:
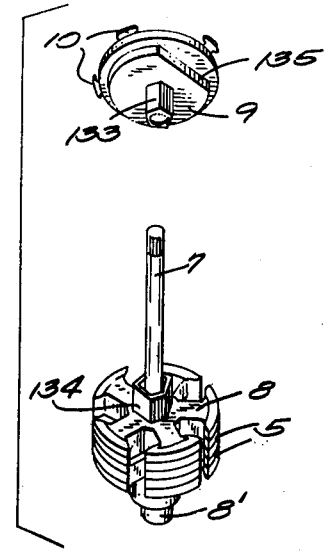

FIG. 29 illustrates the situation at the instant the top end lamination has been pushed home to produce the subassembly shown in the lower part of FIG. 23. The upper part of this view shows the commutator which is added to the assembly at station D.

With reference to FIG. 31, it will be seen that the hands of the transfer arm at station D are again generally similar to those at station B. Hence, they have three gripping fingers 130 seated in longitudinal grooves formed in the cylindrical surface of a stem 131 that is solidly fixed to and projects down from the transfer arm. The claws 133 on the lower ends of these fingers snap over the edge of the commutator as it is picked off the delivery station 98 (FIG. 11) and hold it against the bottom of the stem 131. After the transfer arm has been rotated to align its hand with the commutator in its grasp with the pocket 82 that contains the armature subassembly to which the commutator is to be added, descent of the transfer arm impales the commutator onto the shaft of that subassembly and drives the hub 133 of the commutator into a socket in the hub 134 of the top end lamination 8.

It is to be noted that the hub 133 and the socket in the hub 134 have a pentagonal cross section, so oriented with respect to the winding receiving slots in the stack of laminations and also the terminals of the commutators, as to assure correct alignment therebetween.

Attention is also directed to the fact that the boss on the underside of the commutator has one flat side surface 135 (FIG. 23) that is parallel with one of the five sides of the hub 133. That flat side 135 coacts with a guide surface (not shown) forming part of the feeder 98a, to bring the commutators to and maintain them in a predetermined position of rotation until they are picked up by the hands of the transfer arm at station D. This enables the establishment and maintenance of a predetermined rotary orientation of the commutator terminal to which the starting and ending leads of the armature winding are attached when the armature core assembly reaches the winding machine. To facilitate the attachment of those leads, the terminal 10' to which they are attached differs from the others, as shown in FIG. 33, and that terminal of every armature core assembly must be in exactly the same position of rotation when it is transferred to the winding machine.

Since it is also essential that the commutator be accurately positioned axially with respect to the core, there is no yieldability in the force with which the commutator is pushed onto the armature shaft. Thus, it is the bottom of the stem 131 itself which engages the top of the commutator and, of course, since the stem is fixed to the transfer arm, the bottom surface of the stem is always moved to the same level by descent of the transfer arm.

Detachment of the gripping fingers 130 from the edge of the commutator in preparation for ascent of the transfer arm, is effected by depressing an upwardly biased pin 136 that is slidably positioned in an axial bore in the stem 131 by means of a "push button" 137 at the top of the pin. During such depression of the pin, a conical surface 138 at its bottom end cams radially movable actuators 139 outwardly to spread the gripping fingers. With the fingers thus spread apart, the transfer arm can be — and is — elevated and then rotated to bring the hand, which had just applied a commutator to the core assembly, into position to pick up another commutator and to align the other hand with the pocket 83 containing the next armature core assembly to which a commutator is to be applied.

Figure 24:
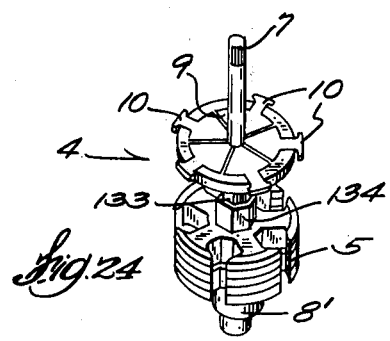

By indexed rotation of the turntable 82, the now completed armature core assembly as it appears in FIG. 24, is brought to the transfer station, identified by the numeral 84 and the letter E — FIG. 11.

(To avoid possible misunderstanding resulting from a comparison of FIGS. 25, 26, 29, 31 and 33, it should be explained that — for ease of illustration — these Figures do not all show the turntables 53 and 82 at the same side of the axis about which the transfer arm turns. Thus, in FIGS. 25, 29, 31 and 33, the turntable 82 is at the left of that axis, whereas in FIG. 27 it is at the right.)

In FIG. 34, which illustrates the transfer mechanism at the transfer station 84-E, the transfer arm 88 has been lowered and one of its hands 89, the one in alignment with the adjacent pocket 83, has the shaft in its grasp. The hands at this station are cylindrical stems bored to receive the armature core shaft and provided with a socket at the bottom end to receive the commutator. As in the hands at station B (FIG. 27) a three ball clutch 118, 120, 121 grips the armature shaft. Although the grip which this clutch has upon the armature shaft of the armature core assembly might be strong enough to pull the armature core assembly out of the pocket 83 as the transfer arm rises in preparation for bringing the assembly into alignment with the waiting carrier 13, to assure that this will take place, the armature core assembly is ejected from the pocket by a force applied thereto by an ejector pin 140. This pin is lifted by a cam 141 (FIGS. 9 and 10) acting through a medially pivoted lever 142.

The ejector pin passes through a hole 143 in the adjacent gear 91 to engage and lift a push rod 144 slidable in a cap 145 secured to the underside of the turntable 82 in line with the pocket 83 in which the armature core assembly is seated. A spring 146 yieldingly holds the push rod in its lowermost position.

It is of course to be understood that at the time the ejector pin 140 is lifted, the gear 91 is stationary and will not rotate until the cam 141 has retracted the ejector pin, and until the rising transfer arm has lifted the core assembly fully out of the pocket 83. Then rotation of the transfer arm through 180° brings that core assembly into position to be inserted into a waiting carrier 13, as shown at the right in FIG. 34.

All of the pockets 83 in the turntable 82 are alike, since they all carry the core assemblies as they are built up at the succeeding stations; and since they are preferably interchangeable, they all have pusher pin assemblies 144, 145, 146 although it is only at station E where those pins perform a function (FIG. 34).

As noted hereinbefore, the spindles 90 on which the transfer arms are mounted, have up and down axial motion imparted thereto by virtue of their connections with the lower one of the two superimposed discs 86 and 87, and — as will be readily understood — it is that up and down motion of the spindles and the transfer arms 88 that brings about the functioning of the hands 89 at the ends of the transfer arms.

During the major part of the up and down motion of the lower disc 87, the upper disc 86 moves in unison with it, but during the initial elevation of the lower disc, the upper one remains stationary. It is during this relative motion between the two discs that a downward force is applied for the purpose described, to the "push buttons" that project upwardly at the ends of the transfer arms; and — to make that possible — the upper disc 86 has depresser fingers 150 depending therefrom at stations A through D. These fingers pass through holes in the lower disc.

At stations A through D, the depresser finger aligns with a pocket 83 in the turntable 82, and in each instance the length of the depresser finger is such that the range of relative motion between the upper and lower discs 86 and 87 produces the appropriate action at the different stations during the initial portion of the ascent of the discs.

At station E, the depresser finger 150' aligns with the axis of the carrier 13 in position to have an armature core assembly shoved down into it. The insertion of that assembly into the carrier is brought about by descent of the hand that had lifted the assembly off of the turntable 82, for — during that descent — the bottom of the hand bears solidly against the top of the commutator. Although there is some frictional resistance to insertion of the core assembly into the cavity of the carrier, that resistance is not great enough to disturb the position of the commutator with respect to the core as the descending hand pushes the assembly into the carrier.

To enable the hand that inserted the assembly into the carrier to rise without pulling the core assembly with it, the assembly must be held down while the hand is lifted. This is accomplished by having the upper disc 86 continue its descent after the lower disc reaches bottom and the core assembly has been fully inserted into the carrier.

By virtue of that relative motion between the upper and lower discs, the depresser finger 150' at station E, moving down with the upper disc to which it is attached, engages the "push button" 151 projecting up from the arm 88.

The connection between the depresser finger 150' and the upper disc 86 has a degree of lost motion, conveniently provided by the engagement of a cross pin 152 fixed with respect to the upper disc and engaged in an elongated notch 153 in the depresser pin. By virtue of this lost motion, the depresser finger will remain in its lowered position holding the core assembly in the carrier during initial ascent of the lower disc and, of course, also the transfer arm. During that initial ascent, the three ball clutch is lifted off the armature core shaft so that by the time the upper disc begins to move up with the lower disc, the armature core is free of the grip the now rising hand had upon the core assembly.

PRESENTATION OF CARRIERS FOR THE RECEPTION OF ARMATURE CORE ASSEMBLIES

Attention is directed to the fact that, in all of the operations involved in the assembly of the component parts of the armature core assemblies, the axis of the assembly was vertical. Accordingly, the transfer mechanism, about to be described, by which the armature core assemblies are taken from the assembling machine and inserted into carriers, must have provision for tipping the axis from vertical to horizontal, since — for the carriers to roll — their axes must be horizontal.

With reference to FIG. 35 which illustrates the structure of the elevator 14 indicated in FIG. 1, but from the opposite side, two empty carriers 13 are shown at the discharge end 160 of the return track 28 ready to drop down into a vertical track 161 that forms part of the elevator 14. A gate 162 at the top of the track 161 controls entry of the empty carriers to the track 161. This gate is pivoted, as at 163, to a stationary part of the elevator and is actuated by an air cylinder, indicated at 164. This cylinder is operated in timed relation with the indexed rotation of the turntable 82 to admit the carriers, one at a time, to the track 161.

In addition to the descending track 161, the elevator 14 also has an ascending track 165. One side of each of these tracks has one stretch of an endless belt 166 riding therein and supported thereby. This belt is trained about vertically spaced pulleys 167, one of which is driven in the direction to cause the stretch of the belt in track 161 to descend, and the other stretch to ascend. The belt runs continuously during operation of the machine.

In the other side of each track, there is a resiliently deformable strip 168, and since the distance between the facing surfaces of the stretch of the belt and the undeformed strip is less than the diameter of the middle flange 30 of the carriers, the resilient deformability of the strips 168 causes the carriers in the tracks to be firmly held against the stretches of the endless blet. Hence the descending carriers in track 161 and the ascending carriers in track 165 are at all times under control as they roll along those tracks. The coaction between the belt and the resiliently deformable strips is illustrated in the lower left-hand portion of FIG. 35 and in FIG. 36.

Partway down track 161, the descending carriers encounter an orientation station 169 beyond which they slide down a guideway 170 that leads to transfer mechanism 171 by which empty carriers are presented to the transfer station 84-E of the assembling machine to have armature core assemblies inserted therein.

The guideway 170 is defined by opposing straight parallel edges 172, 173, provided by the flanges of U-shaped rails 174, 175.

As seen in FIG. 36a, the flanges of rail 174 are spaced apart a distance to receive therebetween only the middle flange 30 of the carriers, but the distance between the flanges of the rail 175 is sufficient to accommodate the cylindrical portion of the carrier hubs between the flat intelligence-forming surfaces thereon. Hence, those flat intelligence-forming surfaces can have sliding engagement with the edges 173. The distance between the edges 172 on rail 174 and the edges 173 on rail 175 is but slightly greater than the diametrical dimension of the carrier hubs perpendicularly from the plane of their flat intelligence-forming surfaces to the opposite cylindrical surface of the hubs. It follows, therefore, that a carrier can enter the guideway only if it occupies a position of rotation at which its flat intelligence-forming surfaces are parallel with the edges 172 and 173. To effect that disposition of the carriers is the function of the orientation station 169. Here a pair of freely rotatable idler rolls 178 and 179 coact with the downwardly moving stretch of the belt 166 to impart rotation to the carriers.

The idler roll 178 is positioned to be engaged by the periphery of the middle flange 30 of the descending carriers, and the idler roll 179 — which is a spool — is positioned to have its flanges engage the cylindrical surfaces of the carrier hubs. Note that the periphery of the idler roll 179 is tangent to the straight edges 173 of the rail 175. Hence, any carrier that arrives at the orientation station 169 with its intelligence forming flat surfaces 35 not aligned with the edges 173, will be detained and rotated until that alignment is achieved. Then the carrier slides down the guideway 170 on its way to the transfer mechanism.

To assure the maintenance of good driving engagement between the descending stretch of the belt and the carrier, the idler roll 178 is carried by a pivotally mounted arm 176 against which a spring 177 bears to press the idler roll aginst the carrier.

After the carriers leave the orientation station and start sliding down the guideway 170, contact between the descending stretch of the belt 166 and the carriers is undesirable. Accordingly, that stretch of the belt is deflected from its straight line path by an idler roll 180.

At the bottom of the guideway 170, a gate 181, pivoted at 182, controls further descent of the carriers and admits them, one at a time and at intervals timed with the cyclic functioning of the assembling machine, to the transfer mechanism 171, FIGS. 35 and 40. The transfer mechanism comprises four nests 183 on a turret 184. The gate is cyclically operated in any suitable manner — as, for instance, by a link 185 connecting it with the lower disc 87 that moves up and down with each index of the turntable 82.

The aforesaid four nests 183 are connected to the turret 185 by equispaced arms 186 that radiate from the turret. The turret is suitably mounted for indexed rotation about a vertical axis by structure that has not been shown, nor has the means for imparting indexed rotation to the turret — beyond indicating the presence of a gear 187 at the base of the turret and with which a drive gear (not shown in FIG. 35) meshes. With each index of the turret, one of the nests 183 is brought into position to receive an empty carrier from the bottom end of the guideway 170.

A transfer mechanism similar to that shown in FIG. 35 is employed at the welding machine 23 where it is illustrated especially well in FIG. 40. The description of the transfer mechanism now being considered, will therefore refer to FIG. 40 as well as FIG. 35. Thus referring to FIG. 40, it will be seen that each nest 183 has a base 188 by which it is connected to its respective arm of the turret for rotation about an axis radial to that of the turret. On this base is a yoke 189 which forms the actual nest and which embraces the carrier placed in the nest. One arm of the yoke is a channel 190, the flanges of which are so spaced that the flat intelligence-forming surfaces 35 of the carriers are engageable with the edges of the channel and thereby maintain the carriers in predetermined rotary orientation. The risers 35' of the steps formed in the hubs of the carriers at the inner edges of their flat surfaces 35, also engage the flanges of the channel 190, so that the engagement of a carrier with the channel also holds the carrier against axial displacement.

The other arm 191 of the yoke which holds the carrier against the channel, is bifurcated. to straddle the middle flange 30 of the carrier and thereby coact with the channel 190 is stabilizing the carrier while in the nest. The carrier is releasably held in the yoke by a pair of connected fingers 192 that are pivoted to the yoke at 193, and spring biased towards the edge of the flanges of the channel. Since these fingers 192 wrap around the hubs of the carrier, they must be swung out away from the channel to permit a carrier to enter and leave the nest.

Referring again primarily to FIG. 35, it will be seen that the nest 183 that is positioned at the bottom of the guideway 170 has its retaining fingers 192 held in the "open" position by the engagement of a roller 193 on one of the retaining fingers, with a stationary cam 194. That engagement took place during the preceding quarter turn of the turret. With the opening of the retaining fingers, the carrier drops from the bottom of the guideway into the open nest.

During the next quarter turn index of the turret, the nest containing the empty carrier it had just received, is rotated 90° to tip the axis of the carrier from horizontal to vertical. The gearing by which the nest is thus rotated as a consequence of indexed rotation of the turntable, has not been illustrated, since it is conventional. Also during that index of the turntable — in fact, at the initiation thereof — the roller 193 rode off the cam 194 and permitted the retaining fingers 192 to move to their closed holding position.

At the completion of that quarter turn index of the turret, the nest with the empty carrier in it is at the transfer station E, as shown in FIG. 34, where an armature core assembly is shoved into the carrier.

The next index of the turret brings the nest, with the now loaded carrier in it, to a discharge station above the mouth of a downwardly inclined track 195 which leads to the bottom of the track 165 in the elevator 14. During that last index of the turret, the nest 183, with the loaded carrier in it, was again rotated 90° to tip the axis of the carrier from vertical to horizontal, so that as soon as the gripping fingers holding the carrier in the nest are actuated to release the carrier, it can roll down the track 195. That release is effected by depression of a spring-held plunger 196 positioned to push down onto the adjacent arm of the gripping finger. The plunger 196 is depressed by a pin 196' concomitantly with actuation of the gate 181 by the descending disc 87. In the event a detecting instrumentality, such as a photoelectric cell — with which the conveyor system is equipped at all strategic locations to control its operation — signals the absence of an armature core assembly in the carrier at the discharge station, an air cylinder 186' retracts the pin 196'. With that occurrence, the empty carrier at the discharge station will not be released. Moreover, the detection of this failure also results in the line being stopped.

With loaded carrier released from the nest it had occupied, the turret resumes its 90° indexing, and the sequence of loading the carriers goes on.

At the bottom of the inclined track 195, the middle flange 30 of the loaded carrier is gripped between the belt 166 and the resiliently deformable strip in the ascending track 165 of the elevator, with the result that the carrier is elevated to the top of the track 15 (FIG. 1). At the junction of the ascending elevator track 165 and track 15, the rising carrier rides onto a pivoted kick finger 200 that is spring-held in the path of the oncoming carrier. As the carrier advances, it rolls along this finger and depresses it, and the instant the carrier reaches the top of the pivoted kick finger, its spring snaps the finger back to its position of rest and the carrier begins its rolling advance along the downwardly inclined track 15.

At its lower end, the track 15 connects with the descending elevator 16, which is like the righthand side of the elevator 14 shown in FIG. 35, and hence has not been detailed in this disclosure. It might be well at this point to explain that the track 15 in FIG. 1 need not be as high as it is shown and that, in fact, the tracks 15 and 17 could be continuations of one another, thereby obviating the need for the descending elevator 16. In practice, the situation is as shown in order to provide a walk-through passage from one side of the line to the other. In any event, the loaded carriers roll down the track 17 to the first of the winding machines.

PRESENTATION OF THE LOADED CARRIERS TO THE WINDING MACHINES

FIGS. 37, 38 and 39 illustrate the manner in which carriers coming from the assembling machine and containing armature core assemblies, are presented to the winding machines. In FIG. 37, the second and third winding machines 18b and 18c are shown.

At the first of these two machines (18b) loaded carriers rolling down the track 19 that comes from machine 18a are either admitted or sent on to the next winding machine by a switching gear SG, depending upon whether or not machine 18b is busy winding an armature. If it is not busy, an automatic gate 210 opens and allows the advancing carrier to pass and enter a feed chute 211 that leads to a saddle 212. The saddle is movable with a horizontal translating motion between an outer receiving position in which it forms a continuation of the track along which the carrier had been rolling, and — more specifically — the feed chute 211, and an inner delivering position to be discussed later.

Before the carrier can drop down into the saddle, its flats locating surfaces 35 must be aligned with straight vertical guides 213 in the saddle. To achieve that needed alignment, a power driven spool 214 (FIG. 37a, sheet 10) which is located at the adjacent terminus of the bottom rail of track 17, imparts rotation to the carrier in position to drop down into the saddle.

The flanges of the spool 214 are so spaced that they straddle the middle flange of the carriers while their peripheries have rolling engagement with the circular inner portions of the carrier hubs. Since the upper rail of the feed chute 211 and the upper end of the straight vertical guides 213 in the saddle, coacting with the spool 214, preclude descent of the carrier into the saddle until the flat surfaces 35 on the carrier align with the vertical guides 213, it follows that the carrier will be detained until the rotation imparted thereto by the spool brings about that alignment.

The instant the flat surfaces 35 on the carrier align with the guide surfaces 213 in the saddle, the carrier drops into the saddle and onto a supporting finger 215 (shown in FIG. 37a, sheet 10) in the bottom of the saddle. It is supported there by the finger 215 and held against rotation by the guides 213 with its axis — and hence the axis of the armature core assembly therein — coaxially aligned with one of two collets 216 on the outer ends of a transfer arm 217. Accordingly, upon inward translation of the saddle to its delivering position, the shaft of the armature core assembly held by the carrier in the saddle, enters that collet and is gripped thereby.

The saddle 212 is now retracted and, as it is, the carrier therein is stripped from the armature core assembly in the grasp of the collet. With the carrier thus withdrawn from the core assembly, the transfer arm 217 is rotated 180° about a fixed horizonal axis equi-spaced from the two collets. By that rotation of the transfer arm, the collet with the core assembly that had just been removed from the carrier in its grasp, is so located that it holds the core assembly at the winding station of the winding machine. With the core assembly in that position, the winding head 218 of the winding machine is moved to its operative position at which its shrouds 218' embrace the armature core and the flier 219 of the winding machine winds wire into the slots in the armature core.

The manner in which the flyer is driven and the winding head is moved towards and from the armature core forms no part of this invention, and moreover, is conventional. In FIG. 37, the winding machine 18b is shown with its winding head in operative position, whereas in the machine 18a, the winding head is shown retracted.

As is well known, during the winding of the coils onto the armature core, the core must be indexed to successively bring different pairs of core slots into winding receiving position. That indexing is done by imparting indexing rotation to the collet 216 which has the core assembly in its grasp. For this purpose, each of the two collets has a gear 220 drivingly connected with it and located at the back side of the transfer arm. As the transfer arm swings from one position to the other, the gear that is drivingly connected with the collet being brought into winding position, meshes with a drive pinion 221 that is periodically rotated by conventional indexing mechanism 222 (FIG. 38).

Upon completion of the winding operation and withdrawal of the winding head 218, the transfer arm is again rotated through 180° to bring the collet with the just-wound armature in its grasp into coaxial alignment with an empty carrier in the saddle 212. Thereupon, the saddle is advanced causing the carrier in the saddle to embrace and grip the just-wound armature. With that operation completed, collet releasing mechanism 222 operates to release the grip the collet had on the armature shaft, enabling the saddle to be retracted. This retraction brings the carrier with the just-wound armature in it, back into alignment with the feed chute 211 and the head end of the adjacent discharge track 20 into which the carrier drops from the saddle in consequence of the supporting arm 215 being swung to its open or inoperative position shown in dotted lines in FIG. 37a.

As best seen at the right hand portion of FIG. 37, a combination track section and elevator 223 is mounted for translatory up and down motion beneath the retracted position of the saddle. When in its raised position, it serves as a track section to guide the carrier dropping from the bottom of the saddle into the track 20 that leads from the winding machine at which the described winding operation took place.

Upon being brought to its lowered position shown at the left in FIG. 37, the combination track section and elevator 223 is below the path of a carrier rolling down the track section 20 that leads from the next upstream winding machine. That carrier thus comes to rest against the bottom end 224 of the track section 20 directly above the member 223. Hence, upon elevation of the member 223, it serves as an elevator and lifts that carrier to the head end of the next downstream track section 20.

The foregoing description of the manner in which the carriers are handled at the winding machines proceeded upon the premise that the machine 18b was available. If that machine were not, but was instead busy winding an armature, the oncoming carrier rolling down the track section 19 leading to winding machine 18b — after bypassing the first machine 18a — would be arrested by the presence of a carrier (shown in dotted lines) being held by the gate 210 at the entrance to the chute 211 leading to winding machine 18b. After being detained in this position for a predetermined period, the switching gear SG at winding machine 18b acts to direct the detained carrier to the next winding machine. For this purpose, the switching gear has an elevator 225 above which the detained carrier came to rest. As that elevator rises, it lifts the detained carrier to the head end of the track 19 leading to the winding machine 18c. In this manner, machine 18b would be bypassed.

The switching gears SG also actuate the gates 210 to release the carriers held thereby at the appropriate time.

In FIG. 37, the elevator 225 of the switching gear at the entrance to winding machine 18b is shown in its lowered position, and in its raised position in the switching gear at the entrance to the winding machine 18c.

As will be readily appreciated, the way in which the carriers are handled as they are presented to and discharged from the several winding machines, is the same at each machine. An advancing carrier with an armature core assembly in it, will always be accepted by the first encountered winding machine that is not already winding coils into an armature core, and the carriers with wound armatures in them will roll down the successive track sections 20 to the elevator 21.

The first winding machine 18a, of course, has no track section 20 leading to it.

The mechanism at each of the winding machines by which the described functions are performed, is illustrated in FIG. 39. The mechanism has a main drive shaft 230 that is drivingly connected with a motor (not shown) to provide a source of power and motion for all of the operating elements of the mechanism, except the transfer arm 217. It is periodically rotated 180° by a motor driven shaft 231 drivingly connected through a right-angle gear transmission 232 with the shaft 233 on which the transfer arm is mounted.

The carrier rotating spool 214 is continually driven by a drive chain 234 connecting a sprocket on the main drive shaft with a sprocket pinion on a shaft 235 that has the spool mounted on it.

The specific structure by which the saddle 212 is mounted for its horizontal translatory motion is not illustrated, but that motion is imparted to the saddle by reciprocating a shaft 236 which is fixed to the saddle and slidably mounted in stationary bearings (not shown). At its inner end, the shaft 236 has an arm 237 fixed thereto, and this arm is connected through a link 238 with one arm of a bell crank 239 mounted on a shaft 240 to rock about a fixed axis. The other arm of the bell crank 239 is connected through a link 241 with one arm of a bell crank 242. This bell crank is journalled on a shaft 243 suitably mounted in fixed parallel relationship with the drive shaft 231 and, on its other arm, has a cam follower 244 that rides on a cam 245 fixed to the drive shaft. The cam 245, acting through the described linkage, imparts reciprocation to the shaft 236 and thereby effects the in and out translatory motion of the saddle required to effect transfer of the armature core assemblies to and from the winding station.

Another cam 246 fixed to the drive shaft, acts through a second bell crank 247 journalled on shaft 243 to impart oscillation to a second shaft 248 that moves with the saddle and is both slidably and rotatably mounted in stationary bearings (not shown). This shaft has the supporting finger 215 fixed thereto so that oscillation imparted to the shaft rocks the supporting finger from one to the other of its positions. The cam produced oscillation of the shaft 248 is achieved by having the arm of the bell crank 247 that is remote from its cam follower 249, pivotally connected to a rack 250 that is suitably guided for reciprocation and meshing engagement with elongated pinion teeth 251 on the shaft 248.

The cam 246 also rocks the gate 210 in proper timed relation. For this purpose, the shaft 254 to which the gate is fixed, has an arm 255 projecting therefrom and connected by a long link 256 with one arm of a third bell crank 257 which, however, is not pivoted on the shaft 243. Nevertheless, this third bell crank swings about a fixed axis and, through a link 257' is connected with the cam following arm of the bell crank 247.

A fourth cam 258 fixed to the drive shaft 230, effects release of the collet that has in its grasp the armature shaft of a just-wound armature that has been brought into position to be inserted into an empty carrier in the saddle. The cam 258 acts through a cam follower 259 at the bottom end of a vertically reciprocable rod 260 that has its upper end connected to toggle linkage 261. This toggle linkage is operatively connected to the collet by which the just-wound armature is held in position to be transferred to a waiting empty carrier by inward motion of the saddle.

Since each 180° rotation of the transfer arm moves an armature core assembly that has been brought to the winding machine by inward motion of the saddle, into winding receiving position and, at the same time, carries a just-wound armature from the winding position to the transfer position in line with the empty carrier in the waiting saddle, it follows that the operative connection between the collet and the toggle linkage 261 must be separable, yet capable of transmitting the needed motion.

PRESENTATION OF WOUND ARMATURES TO THE WELDING MACHINE

The carriers leaving the bank of winding machines with wound armatures in them, roll down the last of the four track sections 20 to the elevator 21. This elevator, in structure and function, is like the ascending half of the elevator 14 previously described and shown in FIG. 35. Hence its details have not been illustrated, suffice it to say that, by this elevator 21, the carriers with wound armatures in them are brought to the head end of track 22. Like that of the track 15, the elevation of track 22 is high enough to provide a walk-through space from one side to the other of the line. The carriers on it roll down to a descending elevator 270 that can be considered a part of the welding machine 23, and down which they travel, as explained in connection with the feeding of empty carriers to the transfer mechanism 171 in FIG. 35.

The transfer mechanism 171 at the welding machine — like the one at the transfer station E of the assembling machine — comprises a turret 184 with four radiating arms 186 that have carrier receiving nests 183 mounted on their outer ends for rotation about axes radial to those of the turret. Since the manner in which this transfer mechanism 171 functions has already been described in connection with the transfer station E of the assembling machine, no need is seen for devoting further description to it in its association with the welding machine, except to note that in this environment it is wound armatures that are presented to the turret and not empty carriers, and that the wound armatures are lifted from their carriers at the transfer station TS (FIG. 40) of the turret where the axis of the carriers and the armature in it is vertical.

Upon being lifted from the carrier at the transfer station TS, the armature is transferred — in a manner to be described — to a welding station at which the lead wires of the armature windings are fused to the terminals of their commutators. That armature is then brought back to the transfer station and inserted into a vacated carrier at the transfer station TS. The following index of the turret brings that carrier with a welded armature in it to a delivery station DS shown at the far left in FIG. 40. Here an air cylinder 271 opens the nest occupied by this carrier which then drops onto the track 24 (FIG. 2) and rolls towards the test and eject station TE. It should be noted that the air cylinder 271 acts only when a turret nest containing a carrier is presented to the delivery station DS.

The armatures are lifted from the nests upon their arrival at the transfer station TS by one of two collects 272 (FIG. 42) depending from a transfer arm 273 that is mounted for rotation, in 180° increments, about a fixed vertical axis and for up and down motion. In each position of the transfer arm 273, one of its collets is coaxial with the axis of an armature in the carrier occupying the nest 183 at the transfer station TS, and its other collet is coaxially aligned with a cylindrical socket in one of two receptacles 274 on the ends of a second transfer arm 275. The transfer arm 275 also rotates in 180° increments about a fixed vertical axis.

The axes about which the transfer arms 273 and 275 and the turret 184 turn lie in a common plane which also contains the transfer arms when the latter occupy their positions of rest. At that time, the receptacle 274 that is not aligned with a collet 272 of the transfer arm 273, is directly beneath and coaxial with a welding tool diagrammatically indicated at 276 in FIG. 42. Thus, upon descent of the welding tool 276, an armature seated in the socket of the receptacle beneath it will have all of its coil leads simultaneously fused to their respective commutator terminals. As can be appreciated, this fusing operation requires a specific rotary orientation of the armature with respect to the welding tool. That orientation is assured by this invention in the manner already described.

Since the specifics of the manner in which armatures are presented to the welding station and armatures that have had their coil leads welded to the commutator terminals are returned to the transfer station, forms no part of this invention — except that, during the entire transferring operation, the predetermined rotary orientation of the armatures with respect to the flat surfaces 35 on the carriers is maintained — no need exists for a detailed description thereof.

The manner in which indexing rotation is imparted to the turret and the two transfer arms will now be briefly described. With reference to FIG. 47 it will be observed that the gear 187 on the base of the turret meshes with gear 227 that is fixed to a shaft 278 journalled in the frame of the machine for rotation about a vertical axis. Below the base 279 of the machine frame, through which the shaft extends, the shaft has two superimposed pulleys 280 and 281 keyed thereto, and below these pulleys there is an arm 282 freely rotatably mounted on the shaft 278.

The upper pulley 280 is drivingly connected with a pulley 283 that is fixed with respect to the transfer arm 275, through a timing belt 284; and the lower pulley 281 is drivingly connected, through a timing belt 285, with a pulley 286 that is fixed with respect to the transfer arm 273. It will be seen, therefore, that with each index of the turret, both transfer arms are also indexed. Through appropriately selected gear ratios, the transfer arms are indexed 180° while the turret index is only 90°.

A cam, indicated at 287 in FIG. 42, is the source of the indexing rotation imparted to the turret and the transfer arms. This cam swings a rocker arm 288, which is suitably biased to maintain its cam follower in engagement with the cam, back and forth about a pivot at its lower end. The upper end of this rocker arm is connected through a pitman 289 with a pin 290 that is slidably mounted in the outer end of the arm 282. It will be recalled that this arm is freely rotatable about the shaft 278. Hence, unless this arm is non-rotatably connected with the shaft 278, cam produced motion of the pitman 289 cannot impart rotation to the shaft or the pulleys keyed thereto.

To effect the needed connection, the pin 290 is projected upwardly into a hole in the lower pulley 281. That is done by another cam, indicated at 291 in FIG. 42, acting through a medially pivoted lever 292 and a connecting rod 293 that has its ends connected with the lever 292 at the pin 291 by universal joints. The cams 287 and 291 are so shaped that just before the forward stroke of the pitman (to the right in FIG. 42) the pin 290 is projected into the hole in pulley 281. The forward stroke of the pitman thus turns the shaft 278 and the pulleys keyed thereto, and the angle of that rotation is just sufficient to impart the 90° index to the turret and the 180° index to the transfer arms.

At the completion of that indexing motion, other cams act to project shot bolts into holes in the just rotated members or parts connected therewith, to hold the same against drifting from their indexed positions, so that proper alignment will be assured between the collets on the transfer arm 273 and the axes of the carrier in the turret and the receptacle of the other transfer arm. The manner in which this is done is not important and no doubt can be understood from FIGS. 41 and 42.

After the cam-produced indexing of the turret and the transfer arms has been completed, the pin 290 is withdrawn from the hole in the pulley 281 and then the rocker arm 288 retracts the pitman 289 to return the arm 282 to its original position.

Since the function of the welding tool 276 must be timed to the indexing of the turret and the transfer arms, the linkage by which the shot bolts are actuated controls electric switches 295 and 296 which, in turn, control the welding tool. Accordingly, the current to the welding tool will not be turned on until the shot bolts are home and will be turned off when the shot bolts are retracted.

The opening and closing of the collets 272 on the ends of the transfer arm 273, as well as the elevation and descent of the transfer arm 273, is effected by mechanism shown in FIGS. 41 and 42. Again, a description of those details is not needed for an understanding of the invention.

FIG. 41 also shows the disposition of a carrier with a welded armature in it, poised above the start of track 24. Upon actuation of the air cylinder 271, that carrier drops down onto the track 24 to roll therealong to the test and eject station TE.

At the entrance to station TE (FIG. 43), the carrier containing a completed armature encounters feed control mechanism which is the same as that by which carriers with unwound armature cores in them are presented to the winding machines — FIGS. 37, 37a and 39. Thus a carrier approaching station TE is first detained by gate 210, then — upon "opening" of that gate — it rolls into the feed chute 211 to be detained at the exit thereof while the spool 214 rotates the carrier to align its flat locating surfaces 35 with the flat guide surfaces 213 in the saddle 212. The carrier then drops down into the saddle.

With the carrier seated in the saddle, the saddle is moved sidewise in the manner and by the mechanism described in connection with FIG. 39, to engage the commutator terminals of the armature in the carrier with the probes 300 (merely indicated by dotted lines in FIG. 43) of the electrical testing instrumentalities at the station TE. These testing instrumentalities form no part of the invention and hence are not illustrated. The important feature of this part of the system is that, since all parts of the carriers are electrically non-conductive, the armatures need not be removed from the carriers to be electrically checked for possible shorts or other electrical defects.

If the check reveals no defects, the saddle brings the carrier back into alignment with the track of the feed chute 211 and with the discharge track 25 and then, upon opening of the trap door, provided by finger 215, the carrier drops down onto the track 25 to roll to an unloading station 301 (FIG. 44).

Armatures that fail to meet the tests to which they are subjected at station TE, are ejected from the carriers they occupied by a suitable ejection device which includes an air cylinder 302 (FIG. 43) that is activated by control instrumentalities governed by an appropriate sensor (not shown) and pops the bad armatures from the carriers before those carriers are released from the saddle. Any suitable means may be employed to carry the ejected armatures away.

At the unloading station 301, a turret 303 with four pockets 304 is indexed to bring its pockets successively into alignment with the end of the discharge track 25 for acceptance of loaded carriers therefrom, and to bring those pockets to an unloading position UP where mechanism (not shown) pops the armatures out of the carriers and onto the delivery conveyor 26. With the next index of the turret 303, the now empty carrier leaves the pocket 304 it had occupied and rolls down a track 305 to the elevator 27. This elevator, like the ascending half of the elevator 14 (FIG. 35) comprises the upwardly traveling stretch of a vertically orientated endless belt 166 and a resiliently deformable strip 168 in parallel spaced relation to that stretch of the belt. As described hereinbefore, the carriers are gripped between the belt and the deformable strip and are thus rolled up the track defined by the strip and the ascending stretch of the belt. Upon reaching the top of the elevator 27, the carriers enter the downwardly inclined return track 28 along which they roll back to the start of the line. It should be noted that FIG. 44 illustrates the elevator 27 and return track 28 from the side of the line opposite that shown in FIG. 2.

MODIFIED CARRIER INTELLIGENCE

FIGS. 45, 46 and 47 more or less diagrammatically show three ways in which the carriers 13 can be held against rotation without providing them with the flat locating surfaces 35.

In FIG. 45, the carrier is provided with an iron insert 310 in the cylindrical surface of its hubs, to coact with permanent magnets 311 positioned where predetermined rotary orientation of the carrier and its contents is to be maintained.

In FIG. 46, the carrier is provided with a light reflecting area 312 spaced radially from its axis of rotation, to be impinged by a light beam from a photosensitive cell 313. Upon such impingement, holding means — here shown as a pair of jaws 314 — is activated in response to closure of an electric circuit (not shown) governed by the cell 313, to grip the carrier axially therebetween.

FIG. 47 shows the rotation interrupting means in the form of a hole 315 opening to the cylindrical surface of a hub of the carrier into which a pin 316 enters to prevent rotation of the carrier. The pin can be mounted to travel with the carrier as it moves towards the work station at which predetermined rotary orientation of the article in the carrier is required.

It is realized that these three ways of equipping the carriers with intelligence and arresting their rotation may not be as practical as providing the carriers with the flat surfaces 35, but they illustrate alternatives, and hence warrant claiming this feature broadly.

From the foregoing description, taken with the accompanying drawings, it will be evident that this invention makes possible the assembly and production of multipart articles, and especially armatures for electric motors, at very high production rates and with a very low percentage of rejects. It will also be apparent to those skilled in the art that, in practice, the total system would be equipped with sophisticated control instrumentalities including photocell-type sensors placed at strategic locations to stop the line whenever a failure occurs at any portion thereof, and to identify the location of the failure. But these accoutrements — essential as they may be to commercial practice of the invention — actually form no part of the invention and hence have not been shown or described. Their omission, however, does not detract from the completeness of the disclosure or its support of the appended claims.

Those skilled in the art will also appreciate that the invention can be embodied in forms other than as herein disclosed for purposes of illustration.

The invention is defined by the following claims.

I claim:

1. In apparatus for presenting articles which consist of assemblies of a number of components including a shaft upon which the other components are mounted, to a work station at which power actuated mechanism performs an operation upon the articles, the performance of which requires that the articles be presented to said mechanism in predetermined orientation with respect thereto, said apparatus including a plurality of identical carriers each having a cavity to receive one of said articles, and a circular periphery on which the carrier rolls with its axis horizontal down an inclined track to the work station, the improvement comprising:
   A. rotation interrupting means on each carrier spaced from its axis of rotation and by which the carrier can be held in a predetermined position of rotation;
   B. locating means on each carrier to engage said articles upon insertion thereof into its cavity and to establish the same in predetermined orientation with respect to the rotation interrupting means on the carrier;
   C. holding means at the work station cooperable with said rotation interrupting means on the carriers to hold the carriers in a position of rotation in which the articles therein are in said predetermined orientation with respect to the power actuated mechanism at the work station;
   D. an automatic assembling machine having instrumentalities to receive the individual components of said assembly and in progressive stages assemble the same into said articles with the shafts thereof vertical;
   E. transfer means operable to grip and present the carriers one at a time and with their axes of rotation vertical, to a receiving station adjacent to said assembling machine;
   F. means to remove said assembled articles from the assembling machine and insert them into the carriers as the latter are presented to said receiving station; and
   G. transfer means to grip the thus loaded carriers and deposit them on said track with their axes horizontal.

2. The invention defined by claim 1, further characterized by:
   orienting means incorporated in said assembling machine to establish a predetermined orientation between the components of said assemblies as they are assembled;
   and means operable as the articles consisting of said assemblies are removed from the assembling machine and inserted into the cavity of the carrier to establish said predetermined orientation of said articles with respect to the rotation interrupting means on the carriers.

3. The invention defined by claim 1, wherein said assemblies are unwound armatures and one of the component parts thereof is a stack of laminations, and wherein said assembling machine includes:
   1. a magazine to hold a supply of laminations, having an outlet at its bottom;
   2. a rotatably indexable table below said magazine having circumferentially spaced pockets that are successively brought to a lamination receiving station in line with the magazine as the table is indexed;
   3. a lamination feeder between the bottom of the magazine and the top of the rotatably indexable table, said lamination feeder having a bore to receive laminations from the bottom of the magazine and conduct them into the pockets in the table; and
   4. means mounting said lamination feeder for movement between a normal position in which the bottom of the feeder is spaced from the top of the table a distance so related to the thickness of the laminations that under normal conditions the topmost lamination in the stack thereof contained in a pocket in registry with the magazine will be clear of the bottom of the lamination feeder at the time the table is indexed, and a relieving position in which the distance between the bottom of the lamination feeder and the top of the table is sufficiently greater than it is when the feeder is in its normal position to allow a topmost lamination that has not left the lamination feeder by the time indexing motion of the table is begun, to disengage itself from the feeder and thus not interfere with indexing motion of the table.

4. The invention defined by claim 3, further characterized by:
   resiliently yieldable means to hold said lamination feeder in its normal position.

5. The invention defined by claim 3, wherein said laminations have reentrant recesses opening to their peripheral edge, and further characterized by a key in the bore of the lamination feeder at the side thereof which is upstream with respect to the direction in which the table is indexed,
   said key having a substantially T-shaped cross section to engage one of the reentrant recesses in each of the laminations that are in the bore of the lamination feeder,
      whereby said laminations are aligned and the bottommost lamination in the bore of the lamination feeder is held against edgewise displacement therefrom during indexing motion of the table until that lamination is fully disengaged from the key.

6. The invention defined by claim 2, wherein said assemblies are unwound armature core assemblies comprising a stack of laminations with coil receiving slots therein and a commutator with a circle of lead receiving terminals, mounted on a common shaft,
   wherein one of the commutator terminals differs from the others,
   wherein said assembling machine has an indexable turntable with pockets in which said unwound armature core assemblies are assembled and by which they are carried to said receiving station (recited in claim 1) with the commutator terminal that is different from the others at all times in the same location, and
   wherein said means to establish said predetermined orientation of the articles consisting of said assemblies with respect to the rotation interrupting means on the carriers as the articles are removed from the assembling machine and inserted into the cavity of the carriers, places said different commutator terminal of every unwound armature core assembly in the same predetermined location with respect to the rotation interrupting means on the carriers.

7. The method of making armatures for electric motors which comprises:
   A. providing a plurality of identical cylindrical carriers each of which has an axial cavity, a coaxial cylindrical peripheral surface on which the carrier can roll, and intelligence on the exterior of the carrier by which the rotary orientation of an unwound armature core assembly and/or wound armature in the cavity can be identified, and by which the carrier can be held against rotation;
   B. assembling stacks of laminations and commutators with a circle of terminals thereon onto shafts to form armature core assemblies;
   C. inserting each armature core assembly into the axial cavity of a carrier in predetermined rotary orientation with respect to the intelligence on the carrier;
   D. placing the thus loaded carrier with its axis horizontal on a downwardly inclined track and allowing it to roll towards a winding machine;
   E. by means of the intelligence on the carrier and cooperating means at the winding machine, holding the carrier in a position of rotation at which a predetermined rotary orientation between the armature core assembly in the carrier and the winding machine is established; and
   F. while maintaning said rotary orientation, transferring the armature core assembly from the carrier to the winding machine.

8. The method of claim 7 further characterized by:
   effecting said transfer of the armature core assembly to the winding machine by
   1. bodily advancing the carrier with the armature core assembly therein axially towards the winding machine while holding the carrier against rotation about its axis,
   2. by gripping means in the winding machine grasping the armature core assembly, and
   3. retracting the carrier to strip the same from the armature core assembly.

9. The method of claim 8 further characterized by:
   A. advancing an empty carrier axially towards the winding machine and effecting insertion of a just-wound armature into the empty carrier with the armature bearing the same rotary orientation with respect to the intelligence on that carrier as the armature core assembly had with respect to the intelligence on the carrier from which it was stripped preparatory to being transferred to the winding machine; and B. returning said carrier with the just-wound armature therein to the track and allowing it to roll towards a welding machine at which the coil leads are fused to the commutator terminals.

10. The method of claim 9 further characterized by:

A. transferring said carrier with the just-wound armature therein from the track to a loading station at the welding machine, and during such transfer swinging the carrier laterally to bring its axis from horizontal to vertical;

B. at said loading station, removing the just-wound armature from the carrier and depositing it with its axis vertical into the welding machine;

C. by means of the welding machine, fusing all of the coil leads to their respective commutator terminals;

D. transferring an armature that has had its leads fused to the commutator terminals, from the welding machine to an empty carrier with the armature in said same predetermined rotary orientation with respect to the intelligence on the carrier; and E. transferring the thus loaded carrier to the track and, during such transfer, reorientating the axis of the carrier to horizontal so that it may roll along the track to a testing machine.

11. The method of claim 10 further characterized by:

A. transferring the carrier with its wound and fused armature therein from the track to the testing machine and, in effecting said transfer, utilizing the intelligence on the carrier to assure that the commutator terminals of the armature are in predetermined orientation as required by the testing machine;

B. without removing the armature from the carrier, testing its electrical continuity; and C. returning the carrier with an acceptable armature therein to the track to roll therealong to another station.

* * * * *